(12) United States Patent
Xu et al.

(10) Patent No.: US 10,827,098 B2
(45) Date of Patent: *Nov. 3, 2020

(54) CUSTOM PRODUCT IMAGING METHOD

(71) Applicant: Sawgrass Technologies, Inc., Mt. Pleasant, SC (US)

(72) Inventors: Ming Xu, Malvern, PA (US); Nathan Hale, Mt. Pleasant, SC (US); Major Murphy, Simpsonville, SC (US)

(73) Assignee: Sawgrass Technologies, Inc., Mt. Pleasant, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/817,684

(22) Filed: Mar. 13, 2020

(65) Prior Publication Data
US 2020/0213473 A1    Jul. 2, 2020

Related U.S. Application Data

(63) Continuation-in-part of application No. 16/774,591, filed on Jan. 28, 2020, which is a continuation-in-part
(Continued)

(51) Int. Cl.
*B41M 5/00* (2006.01)
*H04N 1/54* (2006.01)
(Continued)

(52) U.S. Cl.
CPC .............. *H04N 1/54* (2013.01); *B41J 2/2054* (2013.01); *B41J 2/2128* (2013.01); *B41J 3/407* (2013.01);
(Continued)

(58) Field of Classification Search
CPC . H04N 1/54; B41J 3/407; B41J 2/2128; B41J 2/2054; B41M 5/0047; B41M 7/009; G06Q 30/00; B41F 16/02
See application file for complete search history.

(56) References Cited

U.S. PATENT DOCUMENTS

| 3,844,806 A | 10/1974 | Wegmann |
| 3,948,828 A | 4/1976 | Becker et al. |

(Continued)

FOREIGN PATENT DOCUMENTS

| AU | 200051869 | 10/2000 |
| CN | 1157630 | 8/1997 |

(Continued)

OTHER PUBLICATIONS

Engeldrum, Peter G., Four Color Reproduction Theory for Dot Formed Imaging Systems, Journal of Imaging Technology, Apr. 1986, vol. 12, No. 2, Society of Photographic Scientists and Engineers.

(Continued)

*Primary Examiner* — Yaovi M Ameh
(74) *Attorney, Agent, or Firm* — B. Craig Killough

(57) ABSTRACT

A networked product imaging system includes devices that provide the production of imaged goods. Sellers are easily integrated into the network with minimal or no inventory requirements. Customer requirements are provided to a central computing device (CCD) that has two-way communication with a plurality of geographically separated product image forming devices. The central computing device determines specifications for forming the image on the blank product in accordance with the customer's order. The central computing device selects a product image forming device from the plurality of geographically separated product forming devices for fulfilling the order, based upon factors that include the specification of the product image forming device available, the product image forming inventory and the blank product inventory available at the geographic location of the product image forming device. The selected product image forming device forms the image on the blank product at the remote location.

20 Claims, 18 Drawing Sheets

Related U.S. Application Data of application No. 16/567,708, filed on Sep. 11, 2019, now Pat. No. 10,587,777, which is a continuation of application No. 16/125,920, filed on Sep. 10, 2018, now Pat. No. 10,419,644, which is a continuation-in-part of application No. 15/678,807, filed on Aug. 16, 2017, now Pat. No. 10,075,619, which is a continuation of application No. 15/136,019, filed on Apr. 22, 2016, now Pat. No. 9,781,307.

(60) Provisional application No. 62/249,668, filed on Nov. 2, 2015.

(51) Int. Cl.
  B41J 3/407 (2006.01)
  B41J 2/21 (2006.01)
  B41M 7/00 (2006.01)
  B41J 2/205 (2006.01)
  B41F 16/02 (2006.01)
  G06Q 30/00 (2012.01)

(52) U.S. Cl.
  CPC .......... *B41M 5/0047* (2013.01); *B41M 7/009* (2013.01); *B41F 16/02* (2013.01); *G06Q 30/00* (2013.01)

(56) References Cited

U.S. PATENT DOCUMENTS

| | | |
|---|---|---|
| 3,969,302 A | 7/1976 | Wegmann et al. |
| 3,977,828 A | 8/1976 | Becker et al. |
| 4,042,320 A | 8/1977 | Becker et al. |
| 4,042,545 A | 8/1977 | Defago et al. |
| 4,205,991 A | 6/1980 | Becker et al. |
| 4,207,067 A | 6/1980 | Becker |
| 4,265,630 A | 5/1981 | Bauerle |
| 4,265,631 A | 5/1981 | Becker |
| 4,281,999 A | 8/1981 | Becker et al. |
| 4,370,144 A | 1/1983 | Skelley et al. |
| 4,422,854 A | 12/1983 | Hahnle |
| 4,460,374 A | 7/1984 | Abel et al. |
| 4,550,324 A | 10/1985 | Tamaru et al. |
| 4,559,150 A | 12/1985 | Becker |
| 4,561,789 A | 12/1985 | Saito |
| 4,659,383 A | 4/1987 | Lin et al. |
| 4,689,078 A | 8/1987 | Koike et al. |
| 4,713,081 A | 12/1987 | Becker |
| 4,758,952 A | 7/1988 | Harris et al. |
| 4,820,346 A | 4/1989 | Nowak |
| 4,853,036 A | 8/1989 | Koike et al. |
| 4,969,951 A | 11/1990 | Koike et al. |
| 5,028,262 A | 7/1991 | Barlow |
| 5,041,161 A | 8/1991 | Cooke et al. |
| 5,065,167 A | 11/1991 | You et al. |
| 5,114,477 A | 5/1992 | Mort et al. |
| 5,164,232 A | 11/1992 | Henseleit et al. |
| 5,229,786 A | 7/1993 | Suga et al. |
| 5,250,121 A | 10/1993 | Yamamoto |
| 5,281,261 A | 1/1994 | Lin |
| 5,298,062 A | 3/1994 | Davies et al. |
| 5,350,446 A | 9/1994 | Lin et al. |
| 5,350,789 A | 9/1994 | Sagawa et al. |
| 5,372,852 A | 12/1994 | Titterington et al. |
| 5,385,957 A | 1/1995 | Tobias et al. |
| 5,421,868 A | 6/1995 | Ayalia-Esquilin et al. |
| 5,488,907 A | 2/1996 | Xu et al. |
| 5,592,204 A | 1/1997 | Lin et al. |
| 5,598,195 A | 1/1997 | Okamoto et al. |
| 5,601,023 A | 2/1997 | Hale et al. |
| 5,640,180 A | 6/1997 | Hale |
| 5,643,387 A | 7/1997 | Berhauser |
| 5,734,396 A | 3/1998 | Hale et al. |
| 5,746,816 A | 5/1998 | Xu et al. |
| 5,830,263 A | 11/1998 | Hale et al. |
| 6,197,409 B1 | 3/2001 | Bodager et al. |
| 6,284,004 B1 | 9/2001 | Burglin et al. |
| 6,286,923 B1 | 9/2001 | Sugahara |
| 6,428,134 B1 | 8/2002 | Clark et al. |
| 6,450,098 B1 | 9/2002 | Hale et al. |
| 6,540,345 B1 | 4/2003 | Wagner et al. |
| 6,674,539 B1 | 1/2004 | Serra et al. |
| RE38,952 E | 1/2006 | Hale et al. |
| 7,016,865 B1 | 3/2006 | Weber et al. |
| 7,333,239 B2 | 2/2008 | Oshikawa |
| 7,575,293 B2 | 8/2009 | Snyder |
| 7,654,660 B2 | 2/2010 | Hale et al. |
| 7,828,420 B2 | 11/2010 | Fagerquist et al. |
| 8,056,999 B2 | 11/2011 | Gardner et al. |
| 8,240,798 B2 | 8/2012 | Oshima et al. |
| 9,302,468 B1 | 4/2016 | Xu |
| 9,781,307 B2 | 10/2017 | Xu et al. |
| 10,075,619 B2 | 9/2018 | Xu |
| 10,402,064 B1 | 9/2019 | Al-Sallami et al. |
| 10,419,644 B2 | 9/2019 | Xu |
| 2001/0022596 A1 | 9/2001 | Korol |
| 2003/0146963 A1 | 8/2003 | Murray |
| 2003/0189609 A1 | 10/2003 | Ishikawa |
| 2004/0243481 A1 | 12/2004 | Bradbury et al. |
| 2008/0044587 A1 | 2/2008 | Maeno et al. |
| 2008/0246978 A1 | 10/2008 | Braveman et al. |
| 2011/0102491 A1 | 5/2011 | Kovacs et al. |
| 2013/0108285 A1 | 5/2013 | Spink et al. |
| 2015/0029552 A1* | 1/2015 | Nishizawa ............ G06F 3/1288 358/1.15 |
| 2016/0042255 A1* | 2/2016 | Ganesh ................... G06T 19/20 358/1.15 |
| 2019/0132948 A1 | 5/2019 | Longinott-Buitoni et al. |
| 2020/0169646 A1* | 5/2020 | Xu .............................. B41J 3/44 |

FOREIGN PATENT DOCUMENTS

| | | |
|---|---|---|
| CN | 1608113 | 4/2005 |
| CN | 101248146 | 7/2012 |
| EP | 0525994 A1 | 2/1993 |
| EP | 0558914 | 9/1993 |
| EP | 0602885 A1 | 6/1994 |
| EP | 0622951 | 11/1994 |
| EP | 745651 A1 | 12/1996 |
| EP | 0912792 | 5/1999 |
| EP | 0893260 | 12/1999 |
| GB | 1527396 | 10/1978 |
| GB | 2189436 A | 10/1987 |
| JP | 5353414 | 5/1978 |
| JP | 60042317 | 3/1985 |
| JP | 61118477 | 6/1986 |
| JP | 6257750 | 3/1987 |
| JP | 02049070 | 2/1990 |
| JP | 02049071 | 2/1990 |
| JP | 02051566 | 2/1990 |
| JP | 02051567 | 2/1990 |
| JP | 03234772 | 10/1991 |
| JP | 05221154 | 8/1993 |
| JP | 06057656 | 3/1994 |
| JP | 2005281523 | 10/2005 |
| JP | 2008223193 | 9/2008 |
| WO | WO2002056191 | 7/2002 |
| WO | WO2007088154 | 8/2007 |

OTHER PUBLICATIONS

Symons, Pete, Digital Waveform Generation, Dec. 2013, Cambridge University Press, Cambridge 2014.

Green, Phil. Color Management Understanding and Using ICC Profiles, 2010, John Wiley & Sons, Ltd., West Sussex, United Kingdom.

Millman, Jacob and Taub, Herbert, Pulse, Digital, and Switching Waveforms Devices and Circuits for Their Generation and Processing, 1965, McGraw Hill, Inc., US.

New Possibilities Group, Website Leasing: Lease a Custom Designed and Developed Website, https://www.npgroup.net/website-leasing/, 2001-2020, US.

(56) References Cited

OTHER PUBLICATIONS

Hassan, Alaa, The 10 Most Common Challenges Faced by eCommerce Businesses, eCommerce Training Academy, https://ecommercetrainingacademy.com/ecommerce-business-challeges/, 2020, US.

Heydendael, Casper, Dynamic Content on Websites: Five Problems (and Solutions), https://blog.deptagency.com/dynamic-content-on-websites-five-problems-and-solutions-73, May 26, 2017, US.

Blue Corona, Website Design Services, https://www.bluecorona.com/website-design-services/, 2020, US.

Holweg, Matthias; Lawson, Benn; and Pil, Frits K., How Digital Fulfillment Is Changing Manufacturing, 2020, Harvard Business Review, Harvard Business Publishing, US.

\* cited by examiner

IMAGE FILE:  2d/3d PRODUCT PREVIEW:
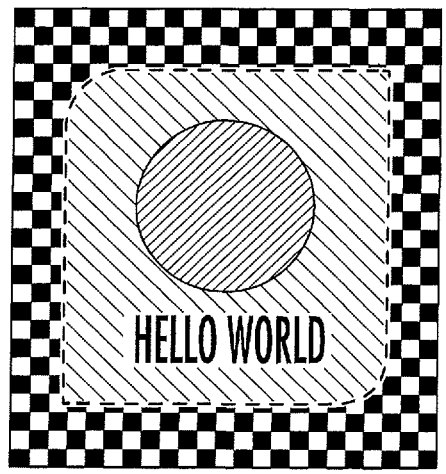 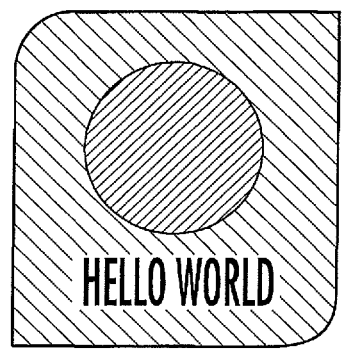
FIG. 5d

BLANK PRODUCT: IMAGED MEDIUM: DECORATED PRODUCT:
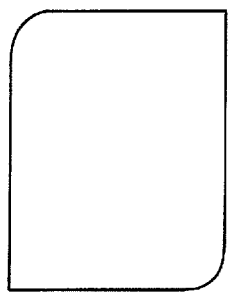 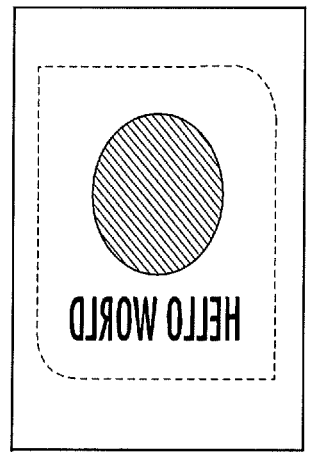 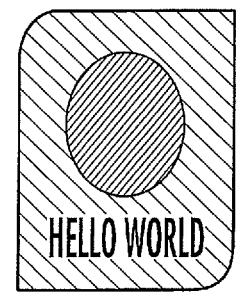
FIG. 8

| IMAGE FORMING DEVICE | EXAMPLES | IMAGE FORMING INVENTORY | EXAMPLES | BLANK PRODUCT INVENTORY | EXAMPLES |
|---|---|---|---|---|---|
| DYE SUBLIMATION PRINTER | SAWGRASS SG400<br>SAWGRASS SG800<br>SAWGRASS VJ628 | WATER BASED SUBLIMATION INK<br>IMAGE FORMING OUTPUT/CONTROL SOFTWARE<br>IMAGE FORMING FINISHING DEVICE<br>TRANSFER MEDIA | SAWGRASS SUBLIJET HD<br>SAWGRASS PRINT MANAGER<br>GEO KNIGHT HEAT PRESS<br>TRUEPIX TRANSFER PAPER | POLYMER (OR COATED) SUBSTRATE | ALUMINUM WATER BOTTLE<br>CERAMIC MUG<br>COATED MOUSE PAD |
| DIRECT TO GARMENT PRINTER | RICOH RI1000<br>ROLAND VERSASTUDIO BT-12 DTG PRINTER<br>KORNIT BREEZE DTG PRINTER | WATER BASED GARMENT PIGMENT INK<br><br>IMAGE FORMING OUTPUT/CONTROL SOFTWARE<br>IMAGE FORMING GARMENT PRE-TREATMENT DEVICE<br>IMAGE FORMING PRE TREATMENT SOLUTION | ANAJET SPRINT GARMENT INKS<br><br>ANAJET ANARIP SOFTWARE<br>VIPER XPT 1000 AUTO PRETREATMENT MACHINE<br>GARMENT PRE-TREATMENT SOLUTION (FOR WHITE INK) | COTTEN OR COTTEN BLEND PRODUCT | T-SHIRT<br><br>TOTE BAGS<br>SOCKS |
| NEEDLE DEVICE | HAPPY HCH-701P EMBROIDERY DEVICE<br>JANOME MB-4S FOUR-NEEDLE DEVICE<br>BROTHER LB7000 EMBROIDERY DEVICE | IMAGE FORMING OUTPUT/CONTROL SOFTWARE<br>EMBROIDERY THREAD<br>HAT AND LETTERING LOOPS | ARTISTIC DIGITIZER SOFTWARE<br>FINISHING TOUCH BOBBIN THREAD VARIOUS COLOURS<br>JANOME HAT LOOP | FABRIC MATERIALS | TOTES<br>POLO SHIRTS<br>BATHROBES<br>SOFT FURNISHINGS |
| CRAFT CUTTER/PLOTTER DEVICE<br>3D LASER CUTTER/PRINTER | CIRCUIT MAKER<br>SILHOUETTE CAMEO 4<br>GLOWFORGE PLUS LASER CUTTER | IMAGE FORMING OUTPUT/CONTROL SOFTWARE<br>IMAGE FORMING MEDIA<br>IMAGE FORMING FINISHING DEVICE | SILHOUETTE STUDIO<br>HEAT TRANSFER VINYL<br>SWING HEAT PRESS / CRICUT EASY PRESS | CRAFT AND FABRIC MATERIALS | APPAREL<br>GIFT CARDS/TAGS<br>FURNISHINGS |
| LED-UV PRINTING DEVICE | MUTOH VALUEJET<br>VERSAUV LEF-300 UV FLATBED PRINTER | UV-LED INK<br>IMAGE FORMING OUTPUT/CONTROL SOFTWARE | MUTOH'S UV-LED<br>WASATCH RIP | CRAFT AND FABRIC MATERIALS<br>ACYLIC<br>GLASS/METAL | DRINKWARE<br>WALL ART<br>GIFTS AND AWARDS |

FIG. 10

CUSTOM PRODUCT IMAGING METHOD

This Application is a continuation in part of application Ser. No. 16/774,591 filed Jan. 28, 2020, which is a continuation in part of application Ser. No. 16/567,708 filed Sep. 11, 2019, which is a continuation of application Ser. No. 16/125,920, filed Sep. 10, 2018, now U.S. Pat. No. 10,419,644, issued Sep. 17, 2019, which is a continuation in part of application Ser. No. 15/678,807, filed Aug. 16, 2017, now U.S. Pat. No. 10,075,619, issued Sep. 11, 2018, which is a continuation of application Ser. No. 15/136,019, filed Apr. 22, 2016, now U.S. Pat. No. 9,781,307, issued Oct. 3, 2017, which claims the benefit of Provisional Application Ser. No. 62/249,668, filed Nov. 2, 2015.

BACKGROUND OF THE INVENTION

Digital technology allows mass customization of objects. High volumes of articles may be imaged ("mass"), with each article potentially having a different image ("customization"). Single articles or low volumes of objects may also be economically customized using digital printing methods.

Mass customization offers advantages over traditional mass production methods. Unlike traditional mass production process, mass customization provides fast changes between different designs, substrates, blank products, printer settings, ink selection, etc. without having to manually change machinery or operational parameters. Due to the ever faster business cycle, customers prefer to receive finished goods with customized images using the fastest possible methods.

Frequently, persons who are interested in providing customized goods through e-commerce do not have the technical skills to set up an e-commerce platform, or they do not have the technical skills to provide product fulfillment of the customized goods. There is a need for a solution for startup owners with digital equipment or manufacturing resources who lack of proper e-commerce platforms, web design skills or knowledge, to connect, interface or realize their commerce objectives. There is also a need to provide product fulfillment over a wide geographic area to those who have creative ideas but who do not have skills in the areas of imaging technology, graphic design, product design, color esthetic, or digital imaging management specialties for production of customized products from blank product items. There is also a need for cost reduction in producing such customized products for small sellers where expensive hardware, software or design tools must be purchased.

SUMMARY OF THE PRESENT INVENTION

The present invention provides networked imaging devices and methods for digitally decorating or customizing blank products formed of various substrates. The ecosystem may include connected digital end-user devices such as computers, internet/web based online intelligent software for graphic design, image creation or modification and image metadata processing. At least one remote fulfillment center provides a product image forming device, and image forming inventory and blank product inventory.

Digital imaging, printing and shape forming according to the invention provides consistent image quality, even though imaging takes place at multiple geographically diverse and remote order fulfillment locations. The use of networking provides optimal control of imaging parameters irrespective of the image formed or colors printed, environmental conditions, and blank product to be imaged. Networking also reduces delivery time and cost of the imaged article to the consumer or customer.

A networked product imaging system includes devices that provide the production of imaged goods. A customer, who may be a consumer selects minimally an image and a blank product upon which the image is to be formed. The customer's requirements are provided to a central computing device (CCD) that has two-way communication with a plurality of geographically separated product forming devices. Each of the geographically separated product image forming devices communicates to the central computing device a specification of the product image forming device and product image forming inventory and blank product inventory associated with the product image forming device and available to the product image forming device. The central computing device determines specifications for forming the image on the blank product in accordance with the customer's order.

The central computing device then selects a product image forming device from the plurality of geographically separated product image forming devices for fulfilling the order, based upon factors that include the specification of the product image forming device available, the product image forming inventory and the blank product inventory available at the geographic location of the product image forming device. The selected product image forming device forms the image for the blank product at the remote location.

The networked product imaging system may provide website creation for a seller or merchant that is part of the network. Participants may choose different levels of website creation assistance that are a function of factors such as web page complexity, custom products offered, price management, promotional activities, payment options and other factors.

BRIEF DESCRIPTION OF DRAWINGS

FIG. 5d demonstrates an image design and imaged product preview using a product template.

FIG. 8 depicts a transfer imaging process of a blank product.

FIG. 10 shows options for the product image forming device, the product image forming inventory and blank products at geographically remote locations.

DETAILED DESCRIPTION OF PREFERRED EMBODIMENTS

A digital image is created using a central computing device (CCD) 4, or a digital image is supplied to the CCD. The CCD communicates with a plurality of remote product image forming devices to determine specifications, capabilities and locations of the product image forming devices. The CCD selects a preferred product image forming device, such as a printer 6 that is digitally (computer) controlled 5.

Figure 1:
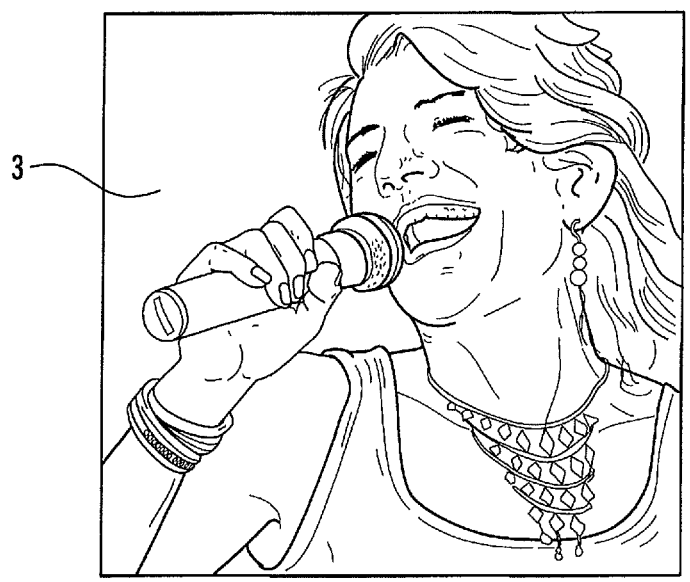
FIG. 1 illustrates an example of an image formed by a product image forming device on a blank product.
Figure 2:
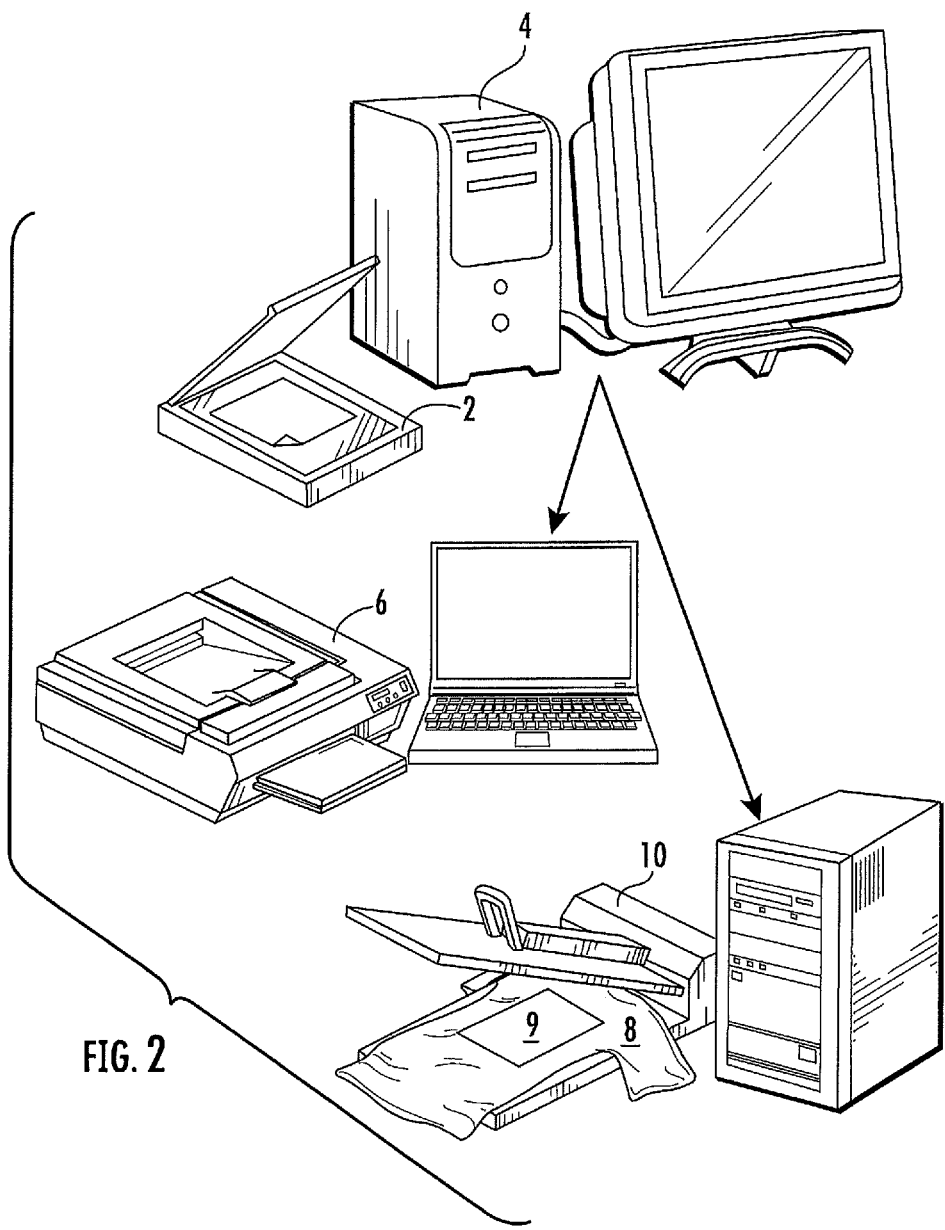
FIG. 2 is an illustration showing exemplary elements of a remote computing device including a product image forming device that is a computer controlled printer and a heat press

The image design may be generated by the CCD or by another digital device. Computer design graphic software may be used, or photography may be used. As shown in FIG. 2, the image design may be read by a scanner 2 and the design communicated to the CCD 4. The design may be photographic, graphic, artistic, or simply letters or words. The use of cyan, yellow and magenta, and optionally, black ink compositions allow the printer to print in full color or multi-color designs.

In this example, the printer prints the image 3 onto a medium 9, which may be paper. After the image is printed onto the medium, the image is positioned against the final or receiver substrate 8, and activated by the application of heat and pressure from a heat supply 10. The image is permanently transferred from the medium to the final or receiver substrate by the application of heat and pressure. For example, the image may be transferred onto a textile substrate, such as a shirt 8, although the image may be transferred onto other materials as a final substrate, such as metal, ceramic, wood, or plastic. The design 3, which is printed onto the medium 9 without activating the ink, is placed against the final substrate which may be a shirt 8. A temperature which is sufficient to activate the dye is applied by a heat supply such as a heat press 10. In another embodiment, the image is printed onto the final or receiver product, and the colorant is heat activated after printing by the application of heat to the image.

The process described herein allows remote custom imaging and decoration of small or large quantities of objects ranging from clothing to housewares to personal items. The process permits different images to be formed in uninterrupted succession by the product image forming device. Blank products formed of different material may be imaged in succession. For example, a printer can print a series of images, a, b, c, d . . . x, y, z, in succession, wherein each of the images is different from the other. Each of the images are formed to specifications that yield optimal quality on a specific material from which the blank product is formed. For example, image a may be intended for a textile product; image b for a different textile composition from image a; image c intended for a ceramic, image d for a ceramic of curved shape; image e for a wood product and image f for a metal product to be engraved. To obtain optimal quality, such as photographic quality, the characteristics of the image, as well as the image itself, must be adapted to the blank product. Factors such as two levels of dot gain and other factors must be considered, and the performance of the product image forming device changed for each image for developing a data matrix. At the same time, especially by using a computer driving multiple product image forming devices, this process of custom decoration of objects can be achieved on a commercial production basis using various sizes and types of product image forming devices developed for the product imaging system.

Figure 3:
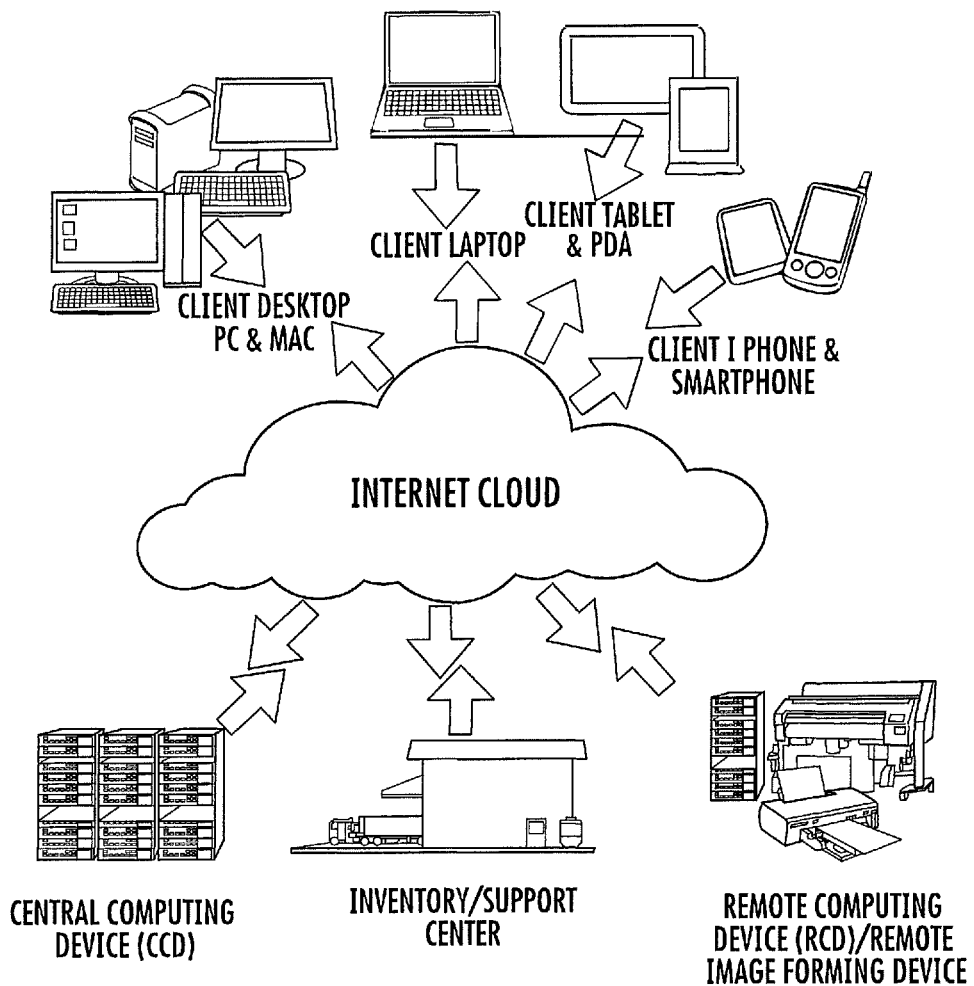
FIG. 3 depicts components of a networked product imaging system.

In one embodiment, a mass customization system and method of imaging is employed. A web/internet or cloud based server provides end users with an interface for customized image design and product order processing, and an internet or cloud linked inventory and order support center for supporting activities. FIG. 3. The web/internet or cloud based server, which may be designated as a CCD, may be connected to the internet and linked to multiple client devices. A client device is a digital device such as an RCD (usually comprising a product image forming device) that is capable of connecting with and communicating with a network, and is preferred to be able to download, modify and transmit digital images. The RCD is preferred to be able to accomplish customized ordering, typically using network interface tools, which may be provided by the operator of the CCD to the client. Examples include independent computers, tablets, PDAs, smart phones and the like. The invention comprises at least one remote fulfillment process center where a remote computing device (RCD) comprising a product image forming device resides, and at least one Inventory/Support center. Blank products that are imaged by the heat activated imaging method may be directly and intelligently graphically designed, modified, and ordered from remotely situated client devices.

The internet or cloud based CCD is a computation server that provides tools and database(s). The CCD may comprise multiple markup language interfaces and protocols that enable various end user or client devices to access the CCD. These user devices include, but are not limited to, desktop computers, laptop computers, tablets/phablets, smartphones or personal digital assistant (PDA) devices, which may be of various operating systems. FIG. 3. The CCD may provide graphic customer design tools that can be accessed and operated from the user devices, allowing on-device quick design and product ordering, and eliminating the need for a user to own expensive graphics design software.

Figure 4A:
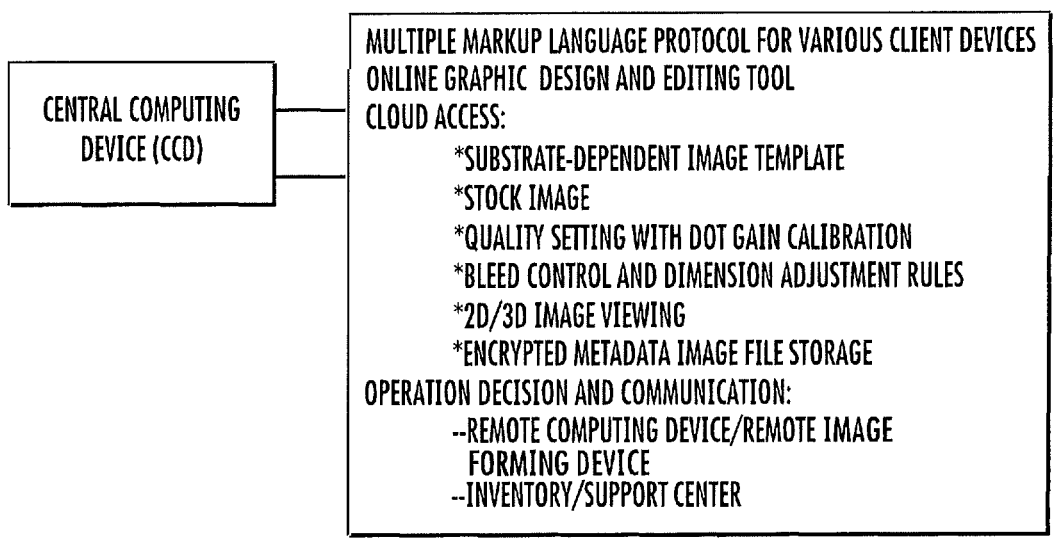
FIG. 4a indicates data communicated to and from the Central Computing Device by a web/internet or cloud based server.

FIG. 4a demonstrates other components of the CCD that assist the customization process. These components include, but are not limited to: substrate-dependent image templates for specific product image forming inventory, stock images (and/or text fonts), quality or resolution (due to dot gain, etc.) components, bleed control and dimensional adjustment rules, 2D or 3D image viewing of intended image objects with color accuracy calibrated for the device, metadata encryption or encoding for secure transporting through the internet/cloud, and finished metadata storage and queuing communications.

Depending on the selection of the blank product, image and product image forming device, dot gain correction not only eliminates heat activation imaging process quality distortion, but also ensures that what the user views from on an output device, such as a web browser, is consistent with the finished product, both with regard to color accuracy and reproduction of fine detail of the image. Depending upon the blank product, ink, process parameters, and/or other specific needs or requirements selected, instructions may be given to a remote fulfillment process computing device (RCD) for matching imaging parameters such as printhead waveform, piezo pulse frequency, driving force (voltage) or pressure, ink droplet size (grey scale), heat fixing of the image or other imaging process parameters.

Many substrates used for imaging by heat activation of inks or colorants require surface treatment, such as coating the substrate with synthetic materials. For instance, ceramic materials are coated with polyester or polyurethane to provide effective reception of heat activatable images. Natural fibers and many textile substrates require similar treatment to achieve vivid colors upon heat activation to permanently bond colorants to the substrate. Heat activation may be limited by the shape and size of heat fixing or transfer equipment, such as a heat press. Only the areas of the substrate that are within the dimensions of the heat press (or other types of heat activation equipment) are imaged successfully.

The web server CCD software provides an intelligent application that is available to a remote user having minimal local design tools. The data base of the server contains detailed blank product information. Areas of the substrate that are available for imaging, and the image dimension/shape are selected from the client device, and are automatically adjusted to ensure proper coverage of the final, image receiving substrate, without leaving undesirable void or blank areas. This feature is referred to as the "Bleed Control Rule."

The Bleed Control Rule of the CCD software may be applied when the final, image receiving substrate is dimensionally smaller than the dimension of the heat press or other heat activation treatment equipment. An image will be enlarged, or occasionally, shrunk proportionally along both planar sides to provide a borderless imaging of the object. The Bleed Control Rule may prevent inconsistent borders on the object, achieving a superior aesthetic result, while covering the entirety of the object. This technique is especially useful when the object to be imaged is small, and coverage of the entire imageable area of the object is desirable.

The web server CCD intelligence software may adjust imaging resolution based upon the selected blank product to be imaged. For example, a 75 line-per-inch loose weave textile substrate requires printing resolution that is generally no higher than 150 dots-per-inch. A higher resolution will not achieve higher image quality for loose weave textiles, but will consume more ink and require a longer printing time. On the other hand, a coated metallic substrate may be able to receive the highest possible photographic image quality a printer can provide. Lookup tables of various substrates may be employed by the intelligence software that corresponds to efficient printing resolutions.

Figure 4B:
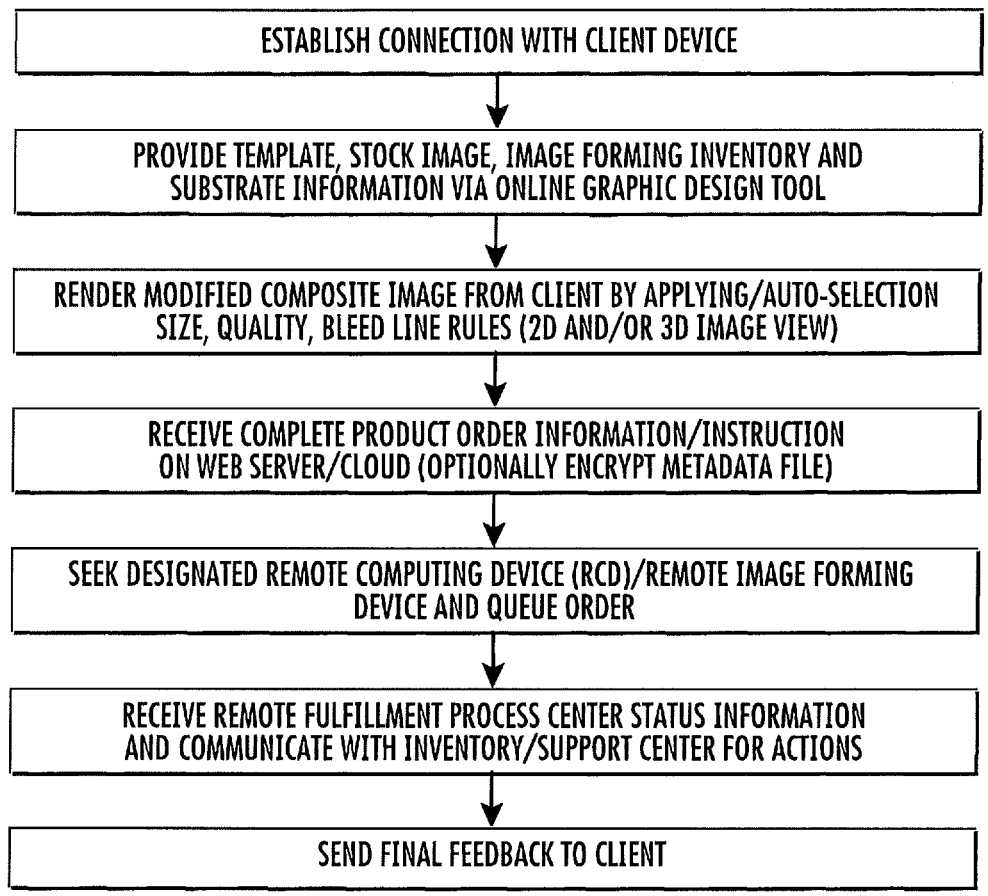
FIG. 4b is a block diagram showing example workflow of a networked product imaging system.

FIG. 4b depicts an example of a workflow process employing software that may be available to the CCD. Upon establishing a connection between the CCD and a remote product image forming (client) device, using a web browser, a blank product to be imaged is selected. A local image that resides on, or is locally provided to, the user device may be loaded into the template for tweaking, overlaying, and/or dimensional adjustment of the image. Alternatively, an image retrieved from the stock image collection of the CCD may be used. Color selection, shape and intensity, and the addition of text with various fonts and artistic effects may be used to provide a final composite image suitable for imaging the blank product. Quality/resolution based, for example, on blank product selection, dot gain information and Bleed Control Rules may then be applied as options, followed by a 2 or 3 dimensional preview. A work-in-progress file may be temporarily saved or added on the HADIMC/cloud, and sent to the customer or RCD for approval or further editing through a virtual realistic look prior to final composite image storage on the HADIMC. After the user is satisfied with the design or modification, other relevant information may be added to fulfill the final product order request. This information may include, but is not limited to, the number of blank products to be imaged, date and/or time of delivery, and a preferred location for pick up or shipment. A metadata file comprising this information is saved on the CCD server or cloud for operational purposes. The CCD software automatically (or manually, if desired) seeks an appropriate remote fulfillment process center for fulfillment of the customer's/user's order. This information is displayed or printed for documenting the operation at the corresponding processing center.

The web server CCD software also monitors the status of each product image forming device, product image forming inventory and blank product inventory (such as substrates, intermediate media, ink, hardware, and supplies) and/or service needs or abilities. Feedback related to customization production, such as cost, date/time-to-deliver, shipping and handling, etc. may be sent from the product image forming device to the client device that initiated the product order or to other designated locations through the CCD.

Figure 5A:
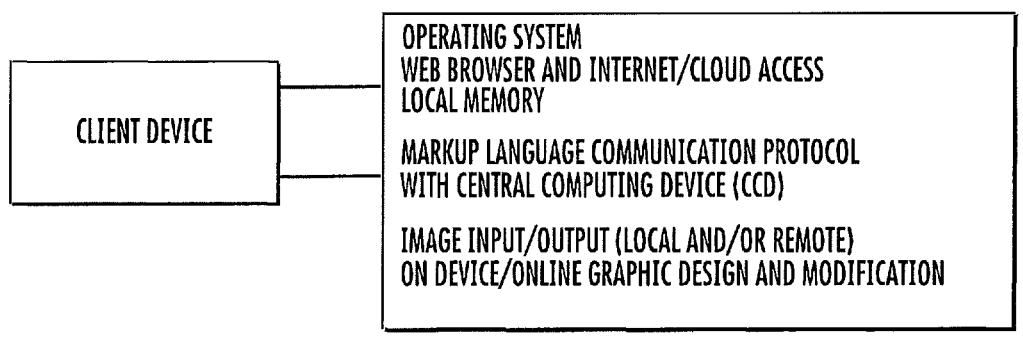
FIG. 5a shows functionality of a product image forming (client) device.
Figure 5B:
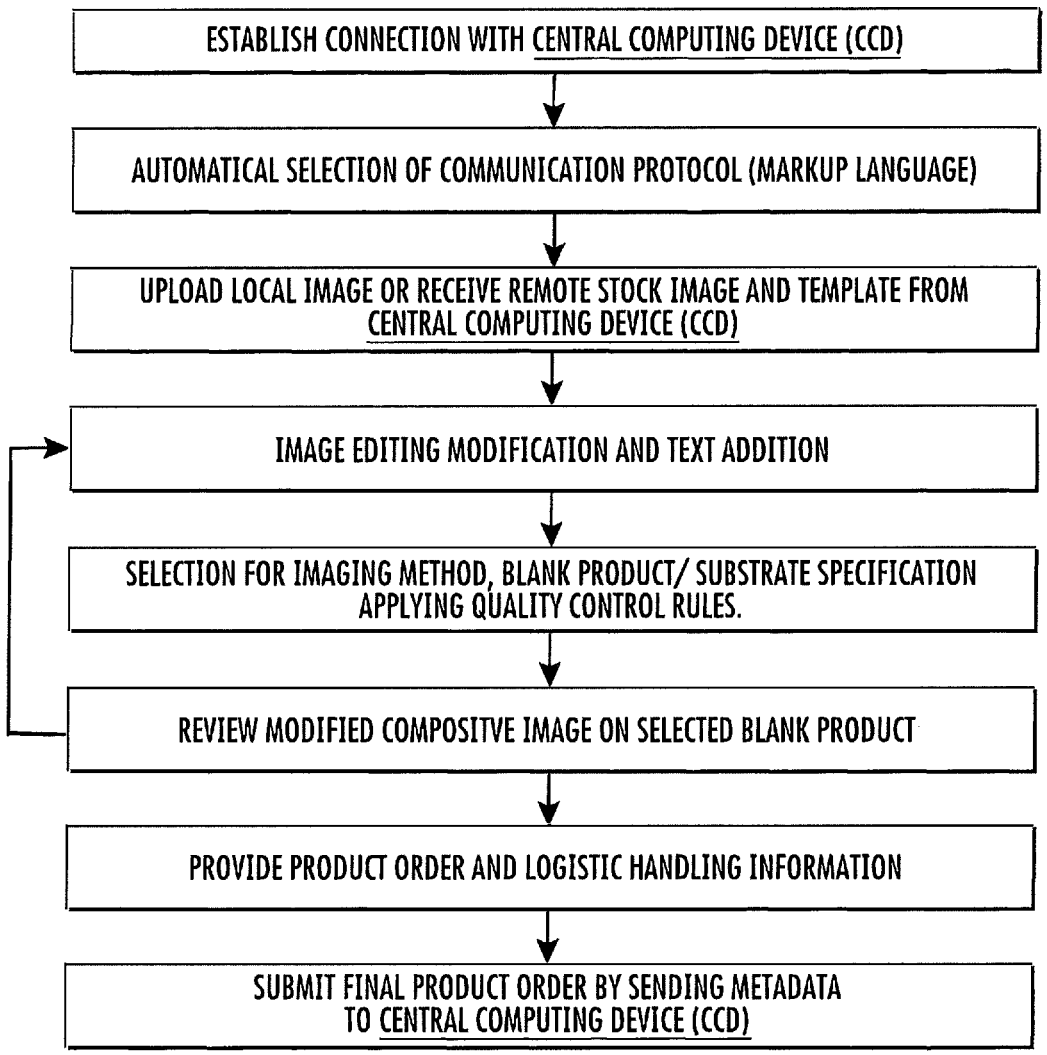
FIG. 5b is a block diagram demonstrating utilization of graphic design tools, image and substrate or blank product information, and order processing through a central computing device.

FIG. 5a illustrates functions and FIG. 5b shows workflow processes at the product image forming (client) device. After connection with the CCD, an automatic selection of program language protocols, such as hypertext markup language, is selected by the user interface for the device browser to engage in tasks required to fulfill the imaged product in compliance with the product order. Depending upon the complexity of the operation, and/or the internet connection speed, either local device memory or memory blocks on the CCD may be used for temporary working image file storage, and for convenience in the event of further modification. This combination of using both the cloud and the user's local device RAM or temporary memory gives a quick and fluid user experience. Final metadata files, such as the composite image(s) for the job, substrate/product choices, shipping and handling information, product image forming device capabilities, product image forming inventory requirements for the job, product image forming inventory volume availability and other inventory related information is preferred to be encoded or encrypted and saved at the CCD location for execution of order fulfillment.

Though both vector and bitmap image types may be used, image files of various formats may be loaded to the online graphic design/modification interface of the present invention, including TIFF/TIF, PNG, JPEG/JPG, GIF, etc. High quality image file types such as PNG with both grayscale and RGB color features, 8 bit color quality or better, and with a transparency option for further modification, are preferred. Lossless compression of images during internet transmission is also desirable. Preferred final (ready-to-print) and fully rendered composite image file types include PNG and PDF.

Figure 5C:
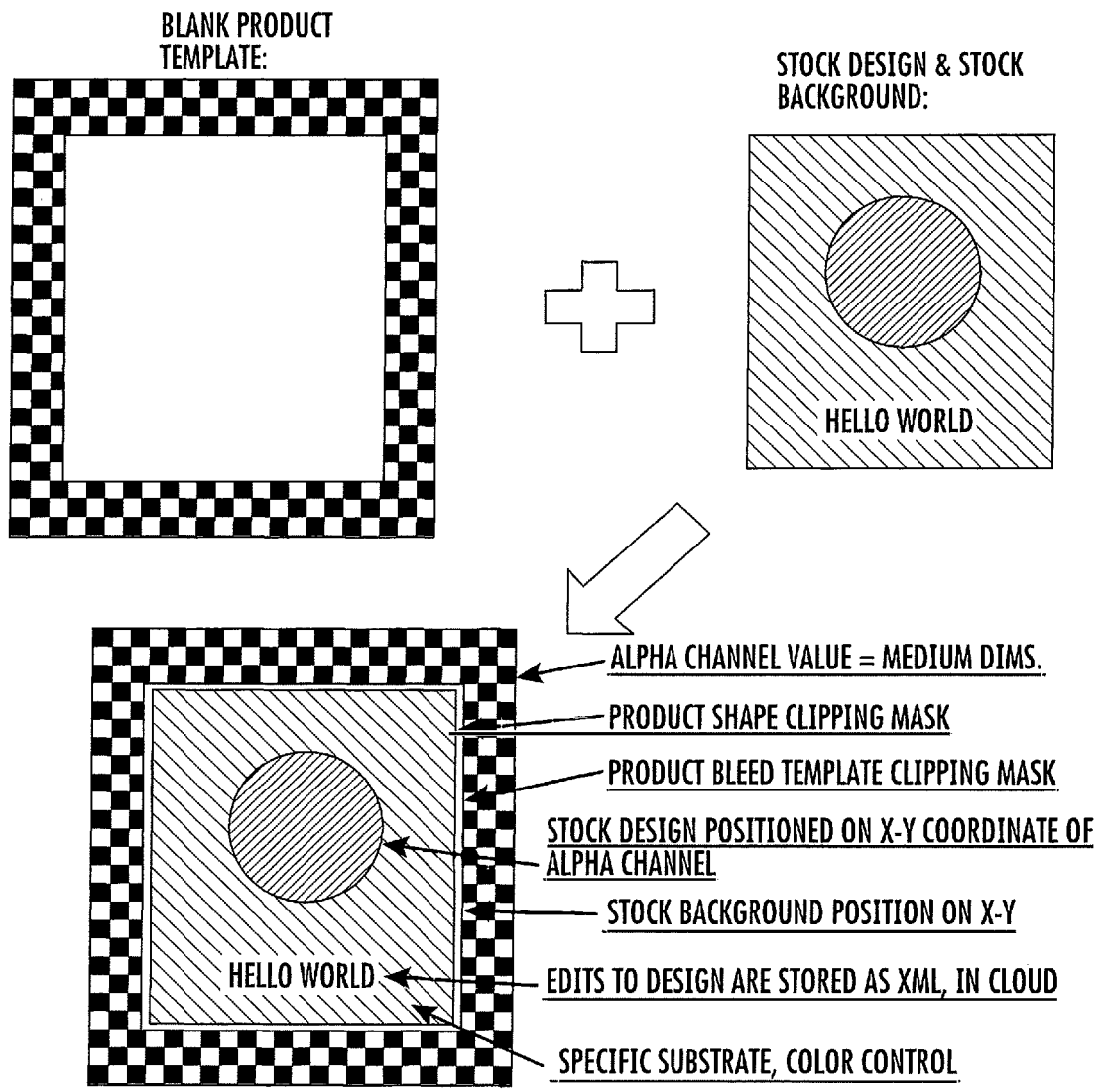
FIG. 5c demonstrates a product imaging process according to an embodiment of the invention.

In an embodiment of the invention, a blank product template specification with a background is first provided by the CCD, including template size (medium size), and product/substrate shape (FIG. 5c). A photographic image, either uploaded from the local client device browser or from a stock image database at the CCD, is placed onto a blank canvas or inserted into a template's existing canvas for the creation of a design. The design may comprise image content, and may include text with desired alpha channel values, or both. A "canvas" as used in this embodiment is a two dimensional plane, with specific pixel width and pixel height, having multiple-layers onto which the user positions raster images and vector objects, including text and/or images. These layers are stacked atop one another. The alpha channel value, or alpha value, of a pixel, in addition to RGB values, on a layer determines the transparency, or the degree of visibility to lower layers. For example, the layer ordering determines whether added text is visible in front of an image or hidden behind. The canvas is precisely sized and dimensioned for the printing medium (or intermediate medium), which endures the image scaling properly during the printing process. Program subroutines from either or both sides of CCD and client browser are used to edit the image design, including Text, that is to appear with the image. The combination of the Alpha Channel values, plus the X-Y coordinates determine where on the medium the image and the text will be placed in different overlapping layers. A product may have a unique shape (Product Clipping Mask), and a slightly larger Bleed Clipping Mask (bleed control rule application) may be used to allow for full bleed printing ("edge-to-edge" or borderless printing). Upon previewing and confirming (FIG. 5d), a fully rendered composite image viewed as a fully trimmed realistic image on the selected substrate may be saved as an imaging file, with parameters used to optimize the imaged product. Such parameters include imaging resolution, spot color replacement/independent ink channel control, two levels of dot gain calibration and adjustment, color management through linearization, ink limiting, ICC profile correction, and/or waveform selection, etc. to best suit various blank product materials such as ceramic, wood, plastic/polymer resinous composite, metal, or fabrics.

Information regarding other operational or processing aspects of the customer's order may be added as metadata to the imaging file prior to queuing into the webserver/cloud, or being sent to a corresponding remote fulfillment process center. A quantity of each ordered product, delivery time, shipping/handling instructions, or pick up time/location may be information provided as part of the order process.

The web based graphic design software accessed via a client device allows the device user to retrieve saved images for further modification, or for future applications, during subsequent user sessions. Customer identification and/or customer order identification may be used for the purpose of session continuation and/or future design and order processes. A user may be enabled to use different devices for different working sessions, as long as program communication protocols can be established between the CCD and client devices.

A markup language (including scripting language) may be used to produce a user interface (UI) facilitating communication between CCD and the client device for purposes that include image editing/modification. Examples of markup languages include HTML/HTML5, XTML, WML (for wireless devices), and Javascript/JSON. Combinations of various markup languages may be used when necessary to enrich the functionality especially graphic design and modification operations. On the other hand, different types of server-side scripting may be used by the web server (CCD), including PHP, ASP.NET/ASP.NET MVC, WebForms, etc., to generate the markup language content that is delivered to the client's browser to render the user interface (UI).

The following is an example of a segment of the markup program language applied at CCD through client user interface (UI) providing five different substrates available for selection. Once selected, other corresponding information may be determined and to be saved in the metadata content.

```
GET https://webserver.company.com/api/substrate/list JSON Response:
{
"Data": [
"Substrates": [
"Mug",
"T-Shirt", "Metal Sign", "Sweatshirt", "Jersey"
]'
"Success": true,
"Errors": [ ]
}
```

Other information may be treated similarly, and may or may not be transparent to the client, such as dimensions, available shipping carriers, and the like. Information associated with the job processed at CCD, but which is not transparent to the client may include operating parameters, dot gain lookup table calculation results, printhead waveform selection commands, etc.

In a process of mass customization imaging according to an embodiment of the invention, a large number of imaging jobs may be dispatched for automatic operation from a CCD to a number of individual and geographically separated locations, either directly, or through one or a plurality of remote computing devices (RCD). In one embodiment, to maintain high quality of printed images, factory sealed and non-refillable or one-time use ink cartridges, reservoirs, or containers, are preferred in order to prevent contamination from the environment. Further, uninterrupted imaging operations achieve efficient product image forming inventory and/or media/blank product usage. This goal may be facilitated by continuous imaging operations to achieve desired performance by, for example, employing a consistent imaging speed, using consistent media advancement, using the same ink batch for the entire job, and employing other imaging related variables that improve quality and efficiency. For example, a print job for an image that is two-meters in length and printed on roll-fed media may waste printing ink and/or media if the job is interrupted for ink replacement or change, media replacement, and the like. Changing an ink cartridge or container before completion of printing of the image may result in air being introduced into the system, requiring printhead cleaning, and ink jet nozzle examination, interrupting the ongoing production printing job. Another example is a multiple-page print job with variable data components. Uninterrupted imaging reduces the likelihood of even small print quality differences among imaged pages. The present invention utilizes safeguards to prevent unnecessary interruptions to resupply product image forming inventory to the product image forming device.

Printers used in networking based imaging according to this embodiment may comprise ink sensors at the remote printers to assist in monitoring product image inventory availability device. The ink sensor may be incorporated into the ink cartridge or container, and is otherwise independent of the printer. Alternatively, the ink sensor may be incorporated into the printer hardware, and may reset or be resettable each time a fresh ink cartridge or container is installed or refilled. The ink sensor is in two way communication with the CCD. An essential mechanism of the ink sensor is detection of the exhaustion of available ink in the cartridge or container, thereby preventing so-called "dry firing" of the printhead. Dry firing may be detrimental to the life of the printhead. Preferably, the ink sensor detects the amount of existing ink for each specific color of ink by cartridge or container, and communicates the information to the CCD, with or without going through any RCD in use.

The preferred ink sensor may detect physical properties of a liquid ink, such as weight, optical density, pH value, electrical conductivity, oxygen or air amount, pressure in the ink cartridge or container, and/or other properties with indication of the change of status in terms of printing ink in the cartridge or container. These physical properties may be converted to electronic signals that are transmitted to, for example, a printer controller memory, the RCD and/or CCD. A plurality of sensors may be used to enhance detection capabilities. Various different mechanical adapters or housings, and communication protocols may be used to host and/or connect ink sensors to networked printers and to the RCD server and/or CCD in real time. Memory chips may communicate detailed information about available ink such as batch numbers, color identification codes, expiration dates, ink volume, encryption codes, serial numbers, etc.

In one embodiment of the invention, the CCD further comprises a processing module that calculates quantitatively the ink volume requirement for each color of the to-be-dispatched imaging job. The ink volume may be determined by either a volume of ink or ink droplet count to be jetted via printhead nozzles. The data derived from the calculation is added to the metadata file that defines the specific imaging job.

An image data file may be converted after the raster process through a Raster Image Processor from user raster data (RGB/CMYK) to print-ready data (RPSC, PCL, or PostScript) to obtain ink usage calculation in terms of volume or weight. For example, a particular image consists a finite and known number of pixels to be dispatched and printed by an eight-channel printer. After the color processing, one pixel might comprise 12% Cyan, 22% Magenta, 8% Yellow, 6% Black (K), 12% Light Magenta, 15% Light Cyan, 26% of Florescent Yellow and 45% Florescent Magenta. A complete discharge (100%) of each color uses 20 pl (picoliter) of ink. An entire single pixel consumes 2.40 pl of Cyan ink, 4.40 pl of Magenta ink, 1.60 pl of Yellow ink, and so forth, with total ink consumption of 29.2 pl according to the example.

In addition to determining image size, image intensity, ink specifications, dithering, number of imaging passes, and the number images to be formed on blank products, total product image forming inventory consumption for each imaging job is determined. A remote location product image forming device capable of fulfilling the imaging product requirement job is selected. This determination considers factors such as inventory consumption efficiency (impacted, for example, by the attrition of the printhead or other wear factors), total imaging time, priming frequency, environmental factors at the remote location (temperature/humidity, etc.), as well as cleaning frequency during printing and/or during any standby period. Jetting efficiency and/or behavior may differ for different ink specifications. For instance, jetting aqueous based ink with low viscosity, low specific gravity or density may be very different from a radiation curable high viscosity, high specific gravity or density ink. Therefore, each printer may have a unique ink consumption profile that is different from any other printers at any given ink set, season or location within the network. Such a profile may be developed by the CCD through iterations of different print jobs to provide improved calculation accuracy. This information may be applied to future print jobs in determining printer selection. The information may be embedded in each metadata file with other print job related information such as color correction, waveform selection, dot-gain control and correction, substrate selection profile, and the like.

Digital printers and other product image forming devices that are digitally controlled use electronic pulse signals. A series of pulses generate a 'wave' to cause discharges of ink droplets or particulates to form color images on media or substrates. Image pixels carrying color and optical density (color strength) messages may be converted into pulse signals at nozzles of printheads through different color channels. The pixels may be differentiated by shape, strength and/or length. These pulses may be recorded by a printer controller memory and collected accurately by either or both of the remote and CCD and converted into weight or volumetric information for each color of inks required for a print job. The information may be combined into ink consumption profiles for designated printers in the network. Depending upon the printer and the printer firmware, different protocols may communicate between a printer and the RCD which is networked with CCD, or directly from the printer to the CCD. Trivial File Transfer Protocol (TFTP) Internet software utility and Simple Network Management Protocol (SNMP) Internet standard protocol are among the preferred communication methods.

The following is an example of software structure useful in facilitating uninterrupted imaging based on an eight-channel printer configuration:

```
float picoliterInkUsageConstant = 20;
float totalPicoLitersMagentaRequired = 0;
float totalPicoLitersCyanRequired = 0;
float totalPicoLitersBlackRequired = 0;
float totalPicoLitersYellowRequired = 0;
float totalPicoLitersLightMagentaRequired = 0;
float totalPicoLitersLightCyanRequired = 0;
float totalPicoLitersFluoPinkRequired = 0;
float totalPicoLitersFluoYellowRequired = 0;
for each (image in job){
for each (pixel in image)
    totalPicoLitersMagentaRequired = totalPicoLitersMagentaRequired + pixel[Magenta] *picoliterInkUsageConstant;
    totalPicoLitersCyanRequired = totalPicoLitersCyanRequired + pixel[Cyan] *picoliterInkUsageConstant;
    totalPicoLitersBlackRequired = totalPicoLitersBlackRequired + pixel[Black] *picoliterInkUsageConstant;
    totalPicoLitersYellowRequired = totalPicoLitersYellowRequired + pixel[Yellow] *picoliterInkUsageConstant;
    totalPicoLitersLightMagentaRequired = totalPicoLitersLightMagentaRequired +pixel[LightMagenta] * picoliterInkUsageConstant;
    totalPicoLitersLightCyanRequired = totalPicoLitersLightCyanRequired + pixel[LightCyan] *picoliterInkUsageConstant;
```

```
    totalPicoLitersFluoPinkRequired = totalPicoLitersFluoPinkRequired + pixel[FluoPi
nk] *picoliterInkUsageConstant;
    totalPicoLitersFluoYellowRequired = totalPicoLitersFluoYellowRequired + pixel[Fl
uoYellow] *picoliterInkUsageConstant;
    }
    }
    }
    for each (printer)
    {
    float picoLitersOfMagentaInPrinter = Query(printer, MAGENTA_INK_REMAININ
G);
    float picoLitersOfCyanInPrinter = Query(printer, CYAN_INK_REMAINING);
    float picoLitersOfBlackInPrinter = Query(printer, BLACK_INK_REMAINING);
    float picoLitersOfYellowInPrinter = Query(printer, YELLOW_INK_REMAINING);
    float picoLitersOfLightMagentaInPrinter = Query(printer, LIGHT_MAGENTA_INK
_REMAINING);
    float picoLitersOfLightCyanInPrinter = Query(printer, LIGHT_CYAN_INK_REMAI
NING);
    float picoLitersOfFluoPinkInPrinter = Query(printer, FLUO_PINK_INK_REMAININ
G);
    float picoLitersOfFluoYellowInPrinter = Query(printer, FLUO_YELLOW_INK_RE
MAINING);
    boolean sufficientInkToPrintJob = true;
    if(totalPicoLitersMagentaRequired < picoLitersOfMagentaInPrinter)
    sufficientInkToPrintJob = false;
    else if(totalPicoLitersCyanRequired < picoLitersOfCyanInPrinter)
    sufficientInkToPrintJob = false;
    else if(totalPicoLitersBlackRequired < picoLitersOfBlackInPrinter)
    sufficientInkToPrintJob = false;
    else if(totalPicoLitersYellowRequired < picoLitersOfYellowInPrinter)
    sufficientInkToPrintJob = false;
    else if(totalPicoLitersLightMagentaRequired < picoLitersOfLightMagentaInPrinter
)
    sufficientInkToPrintJob = false;
    else if(totalPicoLitersLightCyanRequired < picoLitersOfLightCyanInPrinter)
    sufficientInkToPrintJob = false;
    else if(totalPicoLitersFluoPinkRequired < picoLitersOfFluoPinkInPrinter)
    sufficientInkToPrintJob = false;
    else if(totalPicoLitersFluoYellowRequired < picoLitersOfFluoYellowInPrinter)
    sufficientInkToPrintJob = false;
    if(sufficientInkToPrintJob)
    {
    Send(printer, job);
    Exit;
```

If a sensor of a product image forming device indicates inventory depletion but is not capable of detecting and/or communicating a precise available quantity of inventory, a monitoring device may be employed to communicate with the CCD. For example, for each ink cartridge or container, an Ink Level Module (ILM) may be employed, preferably at the CCD, to monitor or calculate the real-time existing volume of ink of each color in the cartridges or containers of each connected printer. The determination of ink volume is based on the known starting ink amount (ink "full" status), ink usage history, standby history, and other factors impacting ink consumption by the printer. This (ILM) volume determination is on printhead jetting activity of each printhead, as well as the printer profile defined by the specifications and history of the applicable printer. In order to maintain a 'ready-to-use' status, printers in standby status may also consume ink for priming to preserve a useful meniscus status for each ink nozzle. Extra priming or cleaning may be needed after a long standby, or even after a power-off period. Changes are monitored and calibrated by the ILM for the CCD in this example.

Figure 6A:
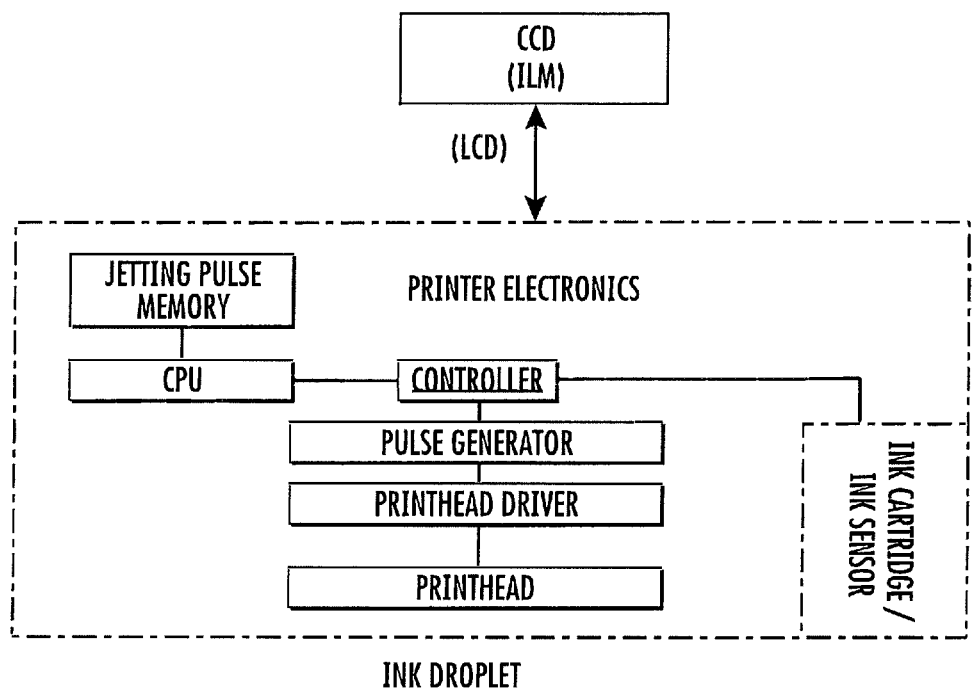
FIG. 6a is a block diagram demonstrating a central computing device (CCD) with an Ink Monitoring System (ILM) communicating with a product image forming device that is a printer connected to the product imaging network.

FIG. 6a illustrates related electronic components and shows bi-directional communication between the CCD and a networked remote product image forming device. The CCD as shown incorporates an ILM.

By way of example, an inkjet printer comprises a central processing unit (CPU). A controller is interconnected with the CPU, a printer driver circuitry, and jetting pulse memory.

An ink sensor is employed in the ink cartridge. An ink cartridge or container (sometimes referred to an ink reservoir) is preferably factory sealed and protected from environmental contamination, and may be physically and electronically incorporated into the printer. Electronic circuitry, for instance, an ASIC (Application-Specific Integrated Circuitry) chip mounted on the ink cartridge completes the printer circuitry loop before it functions, and prevents undesired dry firing. Other mechanical and electronic components may be included in the printer according to the needs of the application.

The jetting pulse generator (or waveform generator), jetting pulse memory, the amount of ink transported through each channel (including ink transported for delivery system purging, priming, printhead cleaning), and the jetting of different droplet sizes (by applying different pulse or waveform intensity and length of time) to form the required image can be accurately recorded and sent to the CCD through the ILM. Additionally, different types of pulses may represent different ink droplet volumes for defined and calibrated ink identifications, and these volumes may be recorded separately. Jetting pulse memory may be reset or otherwise marked when a new ink cartridge is installed, with resetting accomplished either by the printer or by an external computing device. An ink sensor with ink volume measuring capability may be used with information communicated by an external computing device through the printer's electronic circuitry.

A Field-Programmable Gate Array (FPGA) electronic circuitry is proffered for the product image forming device circuitries. The reprogrammable function of FPGA is especially useful when different waveform or pulse selection is required for changing ink sets, or for changing imaging speed. Larger waveform or pulse amplitude and/or longer pulse duration, for example, will generate larger ink droplets for the same ink formulation, which may change the required imaging speed at the same driving pulse frequency. These inks may not be optimally jetted with a universal jetting parameter selection due to different physical properties and fluid flow characteristics that respond differently to the selected waveforms. One embodiment of the present invention is to change jetting waveforms of the networked remote local printers using center, remote, or external computing devices. The printer's electronic memory may be volatile or nonvolatile for storage data, communicating with the computing device through printer input/output (I/O) circuitry. An Electrically Erasable Reprogrammable Memory (EEPROM) chip may be used for jetting pulse memory, either alone or in combination with other types of memory techniques, including simple ROM (Read-only Memory) chips.

Optionally, pulse and/or ink monitoring and calculations for the ILM may be performed at the RCD and communicated directly to the remote location product image forming device, and synchronized in real time with the CCD. Each time a networked product image forming device communicates its availability for use, or a new cartridge or ink container or other product image forming inventory is installed, updated inventory information is sent to the CCD before a print job is accepted.

Figure 6B:
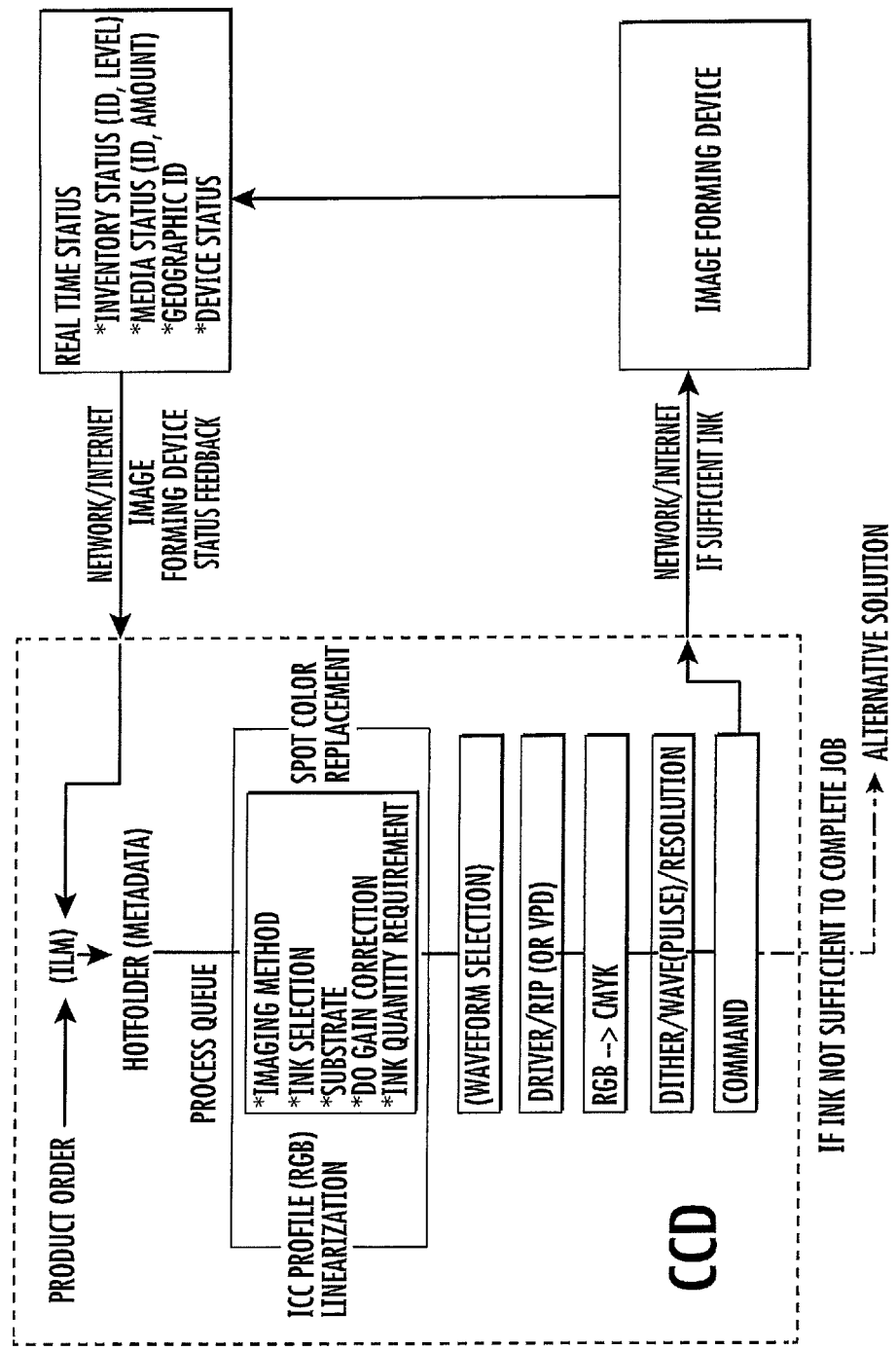
FIG. 6b is a block diagram illustrating exemplary decisions within a CCD and information exchanged between the CCD and a product image forming device.

Each time an imaging job is dispatched to a selected product image forming device, a 'safeguard' of the CCD, which may be part of the ILM, actuates to compare the product image forming device inventory consumption requirement for the product imaging job with the existing product image forming inventory quantity at the product image forming device. For example, each and every color of inks in the cartridges or containers with an ink sensor, regardless of geographic distance of the printer from the CCD or the time of operation. If an insufficient quantity of product image forming device inventory is detected, the imaging job will not start, and a warning notice is sent to the product image forming device. Either a different product image forming device with sufficient product image forming inventory is selected by the CCD and utilized, or additional inventory is supplied before further action. FIG. 6b further demonstrates a preferred interaction between a computing device and networked product image forming devices that ensures sufficient inventory for the product imaging job without interruption. The inventory levels are continuously monitored in real time during the imaging process and updated at the CCD. Blank product inventory may be similarly monitored.

A single imaging job as dispatched from CCD may require various blank products, each having a different inventory usage for proper imaging. For instance, in heat transfer printing where sublimation inks are used, ink limiting factors, printing scan speed, jetting speed, dot gain correction, and waveform selection and/or pixel color ink quantities are a function of the material from which the blank product is formed and may vary even though the image design and intermediate substrate (or transfer media) are the same for each imaged product. For example, hard or non-absorption substrates such as metal sheets require less ink to achieve satisfactory color intensity than soft substrates like non-woven textile materials. Blank product material differences may be accounted for by applying ink limiting parameters by way of software that are appropriate to the blank product to be imaged. Customer orders for the same image on different blank products (for example, a holiday family picture on both ceramic mugs and fabric T-shirt items) may be combined into a single imaging job through the same inkjet digital printer while maintaining optimal image quality using the same ink cartridge set through use of the present invention. The ILM may be used to accurately calculate and anticipate total ink consumption based on substrate correction information and other related parameters, including waveforms, for the same printing job imaging different final substrates, while incorporating the required changes at remote local printers. FIG. 6b.

To enhance the accuracy and/or efficiency of the unique printer profile for each remote product image forming device connected to the central computing device (CCD), a machine learning process, preferably unsupervised, may be utilized based on empirical product image forming device performance data and continuous application behavior. Each time a new geographically remote product image forming device is added to the network, a designated file is constructed through a software program to produce an independent data file in a database located in the CCD. Product image forming device inventory consumption behavior with different variables such as the type of product image forming device, anticipated specific product image forming inventory consumption, operational efficiency for different specifications, droplet sizes, ink evaporation due to humidity fluctuations, average printer prime/cleaning frequency during printing and standby periods, ink compatibility, media and/or substrate compatibility, etc. are established statistically and retained for future reference through a pre-defined mathematical model and data management algorithm that may employ extrapolation such as linear or binomial regression techniques. Model training software mechanisms, such as Knowledge Extraction based on Evolutionary Learning (KEEL) framework, may also be used for automatic selection of the optimal mathematical model chosen from available alternatives. Imaging jobs are dispatched by the CCD with a completed metadata file comprising printer profile data output generated by the ILM.

A similar but simpler safeguard module at the CCD or product image forming device may also be installed to monitor and calculate available blank product inventory. The product imaging job is not communicated to the product image forming device if insufficient blank product is available, thereby avoiding prevent premature product imaging job termination and an unnecessary waste of product image forming inventory or blank product. An example is where a required length of the blank product is insufficient, which could waste product image forming inventory if not discovered before a product imaging job begins.

In an example of a large multiple-page printing job exceeding the capacity of one complete set of ink cartridges or containers, the ILM intelligently selects one or multiple remote printers with the same or similar printing performance profiles, and of the same or similar type and model, ink batch, media batch, and geographic locations, to optimize process efficiency and minimize differences in printing jobs performed by multiple printers. Should unexpected interruption occur during printing, such as a power outage, internet communication interruption, natural disaster, unexplained heavy ink usage, etc., and the originally selected remote location printer cannot complete the printing job, the ILM at CCD will automatically select an alternative networked printer or printers having the closest parameters to the originally selected printer. These parameters may include geographic location, printer type/model, ink batch, media type, and the like, with geographic location typically a priority. Further, and optionally, a printer pause function may be inserted into the printer command, allowing a qualified (ink ID, ink batch, etc.) ink cartridge replacement at page-end (in cut-sheet printing mode) printing.

The ILM is resettable each time a new of ink cartridge or container is installed or refilled. The ink level is recorded as a "Full" status with a known value, and included in the printer profile for the specific printer. It is possible to reset a single color, or to reset an entire set of colors, but the ILM records each individual color ink cartridge or container due to the fact that different printing jobs may result in uneven consumption of color inks. Preferably, ink sensor or storage memory elements at the remote printer are resettable and used as an additional printer profile calibration factors.

An RCD may connect at least one digital product image forming device to the CCD. The RCD may be linked directly with web server CCD. Multiple product image forming device, each at different geographic locations, may be connected to the RCD for high efficiency, high throughput manufacturing and product imaging operations. An RCD may comprise an independent electronic data processing center such as a desktop computer, a laptop computer or computer server loaded with software applications that communicate and pass commands between CCD and local product image forming devices. At least one operating system is used, such as Microsoft Windows, Linux, or Apple OS X.

In an example, an image or multiple images are selected for printing as part of a print job. A blank product for imaging is selected. Typically, these selections are made by a customer and/or user or service provider. The CCD will contribute additional information to facilitate imaging that is based upon the selected image, selected substrate(s), and the manner in which the image is to be formed, such as by printing, engraving, embroidery or shaping of the product.

The CCD determines the product image forming inventory, if any, and blank product inventory required to form the images according to the specifications for the product imaging job. The CCD communicates with a plurality of product image forming device that are geographically remote from the CCD. By geographically remote and geographically separated it is meant that the CCD and each of the plurality of product image forming device are geographically separated such that communication is by internet or cloud connectivity, and that connection by hard wiring is not practical. Typically, the CCD is at least several kilometers from the product image forming devices, and the product image forming devices are located in multiple cities, states, countries and/or provinces.

Each of the plurality of product image forming devices communicates to the CCD product image forming inventory specifications available at the remote location and the quantity of the inventory. Each of the plurality of product image forming device communicates to the CCD a quantity of blank product available and the type or specification of the blank product. The geographic location of the product image forming device is communicated, and may be communicated by an identification code known to the CCD.

The CCD then selects a product image forming device from the plurality of product image forming devices to fulfill the product imaging job. The selection considers the geographic location of the product image forming device(s), the inventory available to the product image forming device and the volume of inventory available at the product image forming device. The CCD provides to the product image forming device information and specifications of the product imaging job for fulfillment of the product imaging job according to customer requirements. The imaging information may comprise, for example, an image specification, an ink specification, a waveform specification and a blank product specification. The imaging information may be provided in a metadata file communicated by the CCD to product image forming device. The image specification may comprise visual graphics (design) information, colors, image size and image resolution.

The CCD may determine the quantity of ink or other inventory required to form the image or images on a blank product or multiple blank products as a function of pulse counts required for the image specification, inventory specification, and blank product specification as described. The foregoing example contemplates, for example, large product imaging jobs, for example, where more than 50 cubic centimeters of ink are consumed by a printer to complete the product imagining job.

One other embodiment of the present invention divides the cloud storage at the CCD into multiple and separate "hot folders" designated for different remote fulfillment centers or RCDs that are remote from each other. Metadata files of each imaging job with ink quantity requirements created from the client device may be accessible at each of the three locations as shown (client device, CCD, and RCD) for further editing, storage and/or processing operations. Different privileges may be assigned or changed for editing, coding/encoding, grouping/regrouping of metadata files for different RCD and/or client devices when such changes are needed. Depending upon the selection method hot folders may be categorized as, for example, according to imaging method, imaging inventory required and quantity thereof, media and/or blank product type and quantity, product image forming devices, other image processing equipment, etc. This method enhances organizing efficiency and reduces the possibility of mismatching among various criteria used in the processes. The following markup language exemplifies inserting a processed composite image file "My design.png" into a printing hold folder in the cloud. A white color t-shirt is used as a substrate and imaged with sublimation ink using waveform "Std A" at the corresponding printer.

```
POST http://webserver.company.com/api/print_hotfolder_3 JSON
Request:
{
"Design": "My design.png", "Substrate": "T-Shirt",
"Color": "White",
"Inktype": "Sb05",
"Waveform": "Std A", "Location": "Auto"
}
JSON Response
{
"success": true, "jobID": 911B873CF
}
```

FIG. 8 demonstrates a uniquely shaped blank product imaged by a heat activation transfer imaging process, incorporating a printing medium (intermediate medium). Note that the printed medium is the same size as the printed file and that metadata such as substrate, print quantity, spot color replacement, ICC profile are taken into consideration. The printed medium is placed in contact with the blank product where heat is applied to activate the ink and permanently bond the image to the substrate.

When the product image forming device is an inkjet printer, the ink jet printer preferably uses high resolution printheads that are preferably supported by firmware having an embedded algorithm calibrated with a data matrix that is dictated by the imaging characteristics of the specific heat activatable ink used. In particular, characteristics for both the first and second levels of dot gain are considered for selected substrate(s) and heat activation parameters. Depending on the incoming fulfillment requirement with quality/resolution information, the algorithm calculates and anticipates the final resolution/dot size, and adjusts printhead jetting behavior and ink droplet volume accordingly throughout the entire image printing cycle, based on the specific, final needs of the image, which is unique for each heat activatable ink application.

The embedded algorithm may be preset on the printer/printhead firmware, but preferably on the RCD and connected to the printer. The embedded algorithm may be adjusted or updated with data that is best suited to the ink and substrate to be printed. Ink characterization and controls may be used prior to printing, or during printing, of the substrate performed by the RCD. Though managed by the RCD, various types of controls may be employed, either directly, or through a variety of software communications, such as a printer driver, raster image process software, color management/profiling software, add-on for graphic application software, etc., as demonstrated in FIG. 6b. In addition, the level of control and degree of adjustment may be different for each ink color channel of the printer to best match color or image quality requirements. Other product image forming devices may have similar embedded algorithms to control, for example, an engraving machine or embroidery machine as applicable.

A preferred printhead has at least two arrays of printing nozzles that are offset with at least one nozzle position in alignment with another. To achieve high quality imaging, a linear nozzle resolution of 150 nozzles per inch or higher is desired. That is, each nozzle array has at least 150 printing nozzles per inch along the direction of the array. The nozzle arrays may be fed by different ink reservoirs or ink tanks, each of very small volume or capacity and positioned inside the printhead upstream from the piezoelectric mechanism, or the nozzles may share one ink reservoir in order to gain high-speed printing, or to improve native printing resolution. By using various physical mounting configurations, and/or applying multiple printing passes, jetting frequency, and/or advancing motor and scanning motor stepping gaps, as well as jetting variable size ink dots (ink droplet with different volumes), native printing resolution of 600 to 1440 dpi, or more, may be achieved, depending on specific ink droplet volumes.

To achieve proper droplet formation with well-defined jetting outcomes careful selection of the jetting waveform or wave pulse is employed. The voltage-time function may be single, double or multiple-peak in shape, depending on the fluid flow dynamic behavior of the heat activatable ink of each and all colors used. Overlapping of multiple pulses with various amplitudes (voltage), shape (for example, rectangular, triangle, sine, etc.), and durations (both pulse and dead time) may be used to secure successful pinch off of droplets while minimizing satellites from jetting of the ink.

Multiple sets of printhead performance data, such as waveform, may be stored or accessible by RCD from the cloud to drive a printer or printers connected to the RCD. This enables a change of jetting droplet size (small, medium or large), frequency/speed, and jetting quality to match different ink physical properties such as viscosity, surface energy, and specific gravity. Ink physical properties may also be impacted by temperature and humidity conditions where the printer/printheads are located. Optimal printer performance and print quality may require the use of a calibrated set of waveforms. Automatically switching and adjustment by the RCD can minimize or eliminate human operator errors in a highly efficient manner in operation. This is especially useful when one printer is equipped with two or more sets of inks, each having different physical properties and/or performance characteristics. Examples include regular four process-color inks (Cyan, Yellow, Magenta, and Black) plus light color inks (such as light Cyan, light Magenta, and light Black, and/or a clear ink), where more than one printhead is used, and different optimal driving waveforms are preferred in order to reduce primary and secondary dot gain.

Optimal printhead driving parameters such as waveform, pulse frequency, ink droplet size, pressure, and voltage, may be obtained by tweaking drop-on-demand (DoD) printhead piezoelectric controller parameters, including voltage height, shape, and time span/duration. This process is typically performed using an ink droplet analyzer or ink droplet observer where video recording or high-speed cameras are used during experimental printhead nozzle or channel jetting to compare performance at various settings for each unique printing ink. Settings in binary form for the most suitable waveforms at a desired driving frequency may then be stored and provided to the printhead controller prior to performing a printing job. Typically, a trapezoidal waveform is used for aqueous based inkjet inks, but the special parameters must be fine-tuned to achieve the required resolution, speed, and/or cleanness (the least degree of satellites, tailing, or the like).

In an application where a single drop-on-demand piezoelectric printhead is used to deliver or jet multiple color inks, whether process-color, spot color, fluorescent color or a combination of various types of inks, it is important that the physical properties of the inks are similar so that the response to the selected driving waveform and/or frequency is substantially the same for each. Generally speaking, physical properties of the ink related to driving behavior include rheology or viscosity, surface and interfacial tension, specific gravity, solid sedimentation behavior, liquid evaporation speed, and the impact of temperature sensitivity on these properties. Careful control of these properties by adjusting different ingredients in the liquid jetting inks may be crucial to jetting performance and consistency of the inks.

When an order is received at a remote fulfillment process center from the CCD, any encoded or encrypted metadata file is decoded or decrypted. Information regarding the specific image file and instructions are provided to the product image forming device. Proper parameters for imaging (waveform, driving force, color management, ink limiting, imaging resolution, dithering, independent printer ink channel control, etc.), imaging inventory consumables (ink type, yarn, thread, paper or intermediate substrate, substrate/final media), procedures (material preparation, after-treatment procedure, etc.) and shipping and handling preferences, etc. are employed accordingly. Operating personnel may then follow the instructions at specific product image forming device(s) and equipment to finish the tasks.

The networked, remote product image forming device and/or the RCD used in an embodiment of the invention carries a geographical identification signal by using a geo-location application programming interface (API), indicating the geographical location (latitude and longitude) of the remote fulfillment center for the purpose of cost calculation of shipping and handling, pickup or delivery, etc. This signal may be communicated with CCD for operation and task control and monitoring. A variety of mapping API services, including commercial services such as UPS, FedEx, USPS, may be used for cost estimation or calculation. Customer or client devices may have the option to select from various process locations from the online design and ordering software for selection of the preferred delivery method. For instance, a traveling customer may submit his product order from Denver, Colo., U.S.A, and choose to pick up the order in Moscow, Russia, where he is scheduled to present the product to his hosting party, thereby avoiding transportation from Denver of finished product. A remote fulfillment process center in Moscow or at its nearest location may be chosen by CCD to process the order for the fastest processing time and the least expensive shipping charges.

Preferably, information used by RCD, such as color profiles (ICC profile), dot gain calibration and correction lookup tables, imaging inventory limiting and linearization files, waveform settings, and/or virtual printer drivers (VPD) etc. are stored on internet/cloud, and are accessible to multiple product image forming devices. This improves data security, and also allows the CCD to update the most recent and effective parameters, and decrease the probability of erroneous operations. Optionally, the RCD may be used in combination with an OEM Printer Driver or RIP (Raster Image Processor). In one embodiment of the invention, the entire information package may be formatted as an installable file (.exe file for MS Windows operating system, .dmg file for OS X operating system) allowing a user connected to the Internet to access and download for local installation prior to imaging.

The RCD may comprise at least one product image forming device with Ethernet protocol (IEEE 801.3). Other protocols may also be used such as Firewire (IEEE 1394), USB (Universal serial Bus) 2:0/3.0, Bluetooth (IEEE 802.15), WIFI (IEEE 802.11) etc. as long as the communication satisfies imaging file transmission speed requirements. In addition, the RCD may connect with a digital display monitor, or a regular document-imaging device, for the purpose of displaying operating instructions to human operators using the system. The relevant operating instructions are included in the metadata file received from the CCD. At the end of each manufacturing process, feedback and status reports may be sent to the CCD along with various monitoring, cost analysis, customer notification, and/or inventory control purposes. Information regarding inventory and support control include, but are not limited to, consumables (ink, paper, intermediate media, shelf-life of consumable), workload, equipment and hardware status, weather (temperature, humidity, extreme weather condition), labor status, and local transportation status, etc.

The following programming examples show communications between CCD and RCD/product image forming device. The first example reports that an RCD is connected, and reports the status of a set of three printers available on that node with each carrying different inks, waveforms, and on-printer ink cartridge usage leveler. This allows CCD to determine whether any parameter changes should be made, or whether materials and supplies are needed, etc.:

```
HTTP POST http://cs.company.com/api/hadig25/report_status JSON
request:
{
"auth token": "5ad0eb93697215bc0d48a7b69aa6fb8b",
"host_name": "RCD-A",
"printer": {
"name": "Printer A",
"status": "Online",
"inktype": "Sb05",
"waveform": "Sb35", "cyan_level": 36,
"magenta_level": 84,
"yellow_level": 54, "black level": 35
},
"printer": {
"name": "Printer B",
"status": "Out of paper", "inktype": "Pg01",
"waveform": "Std03",
"cyan_level": 33,
"magenta_level": 48,
"yellow_level": 45, "black level": 53
},
"printer": {
"name": "Printer C",
"status": "Offline",
"inktype": "Hb01",
"waveform": "Std A",
"cyan_level": 0,
"magenta_level": 0,
"yellow_level": 0, "black level": 0
}
}
JSON response:
{
"success": true
}
```

In the following second example, the RCD queries the CCD for pending jobs ready to print. The response indicates ready jobs and the unique URL at which the print data can be retrieved at each of the three printers at the location.

```
HTTP POST http://cs.company.com/api/hadig05/query_pending_jobs JSON
request:
{
"auth token":
"5ad0eb93697215bc0d48a7b69aa6fb8b",
"host name": "RCD-A"
}
JSON response:{
"job": {
"printer_name": "Printer A", "job_name": "Sample job 1", "copies": 1,
"url":
"http://cs.company.com/jobs/c2300c87-57a7-4acd-bd8d- f005ca7dca8e.prn"},
"job": {
"printer_name": "Printer B", "job_name": "Sample job 2", "copies'.': 1,
"url":
"http://cs.company.com/jobs/7653a379-7995-46f4-b51c-213b2e716785.prn"
},
"job": {
"printer_name": "Printer A", "job_name": "Sample job 3", "copies": 2,
"url": "http://cs.company.com/jobs/0074ac2e-24ce-4054-b910- 1c3f7151ecf5.prn"
}
}
```

The Inventory/support center depicted in FIG. 3 may be in a remote location linked with the internet/cloud for information communication. It comprises product image forming device availability, blank product inventory and product image forming inventory, and may be dispatched as needed. It may also provide supporting technical resources for diagnosis, repair, and/or training. A Just-in-Time (JIT) status of each and every remote fulfillment process center (via RCD) is monitored by the center through the CCD to determine the best approach for operational actions.

While the medium onto which the image is printed for subsequent transfer may be paper, the medium may also be film, textile, metal or other substrates, for either direct or transfer printing applications. With transfer imaging processes, the printing medium may be called an intermediate substrate or medium. While different conveyance mechanisms for the medium may be employed, it is preferred that the medium is transported through the printer carriage in a direction perpendicular to the printhead scan direction. The printer must convey the medium/substrate through the printer during the printing process at a selected advancing velocity in order to achieve acceptable print quality. The surface characteristics of materials of films, metals and textiles vary to a material degree from paper and from each other. The surface friction of metal is substantially different from a textile such as a poly/cotton blend. Accordingly, the medium conveyance or transport mechanism of the printer when used to print media other than paper must be constructed for media of various thicknesses, rigidity and/or surface property at a desired velocity to ensure adequate ink droplet impact stability.

To prevent inconsistent color and other product quality results, it is important that each participating remote fulfillment center and associated product image forming device(s), imaging equipment, product image forming inventory, and blank product are uniform and employ the same standards. For instance, color standards for textiles may be used to calibrate inks, substrates and equipment performance for each participating remote fulfillment process center. These often involve standard calibration equipment such as colorimeter, colorfast equipment, weather meter, and/or detergent. A certification program using the standard may be elected and enforced prior to commercial applications for each remote fulfillment process center to achieve reliable manufacturing quality. Customized standards, or a combination of various standards, may be used to control and monitor consistent performance across the entire system.

The printhead may employ a relatively broad spectrum of driving force frequencies for the piezoelectric system. Variable driving force frequencies allow the production of well-defined ink droplets of variable volumes. "Well-defined ink droplets" means minimizing undesired non-jetting, tailing/Rayleigh breakup, elongation, satelliting or bubble bursting of the droplet at the tip of the surface of printing nozzles. Depending on the physical properties of the heat activatable ink, the driving force frequency may be between 5 kHz and 40 kHz, preferably between 8 to 20 kHz for small printers of the preferred embodiment.

Various types of digital printing inks may be used to practice the present invention, either in combination with heat activatable inks or alone. Printing performance may be enhanced by using first level dot gain control where a direct printing technique is applied, and ink jetting parameter fine-tuning for various porous and/or non-porous substrates that are best suited for the selected ink type. Reactive dye ink, direct dye ink, acid dye ink, cationic dye ink, reactive disperse dye ink, pigment inkjet ink, crosslinkable/self-crosslinkable ink, hot-melt 3D printing ink, radiation or energy curable ink, such as ultraviolet radiation curable ink, may be used alone or in a mixed fashion. For instance, an 8-channel printer may use dual CMYK ink sets, with one set being heat activated inks and the other set being radiation curable inks. During the printing process, each of the two sets is being printed independently, using specific sets of printing control parameters including dot gain control, jetting frequency, waveform and ink droplet size, and the like directly from CCD, or indirectly through RCD In an exemplary imaging method according to the invention, an RCD transmits an image to a CCD, FIG. 3. The image may be provided by a user of the geographically RCD by creation of the image on the device or on another computing device. The image may be downloaded from another source. The geographically RCD may be a computer, including, but not limited to a desktop computer, notebook computer, tablet computer or a cellular telephone with such capacity.

The CCD may communicate to the RCD an image or selection options comprising several images. The images may be manipulated as to form and appearance, as demonstrated at FIG. 5a.

Figure 7:
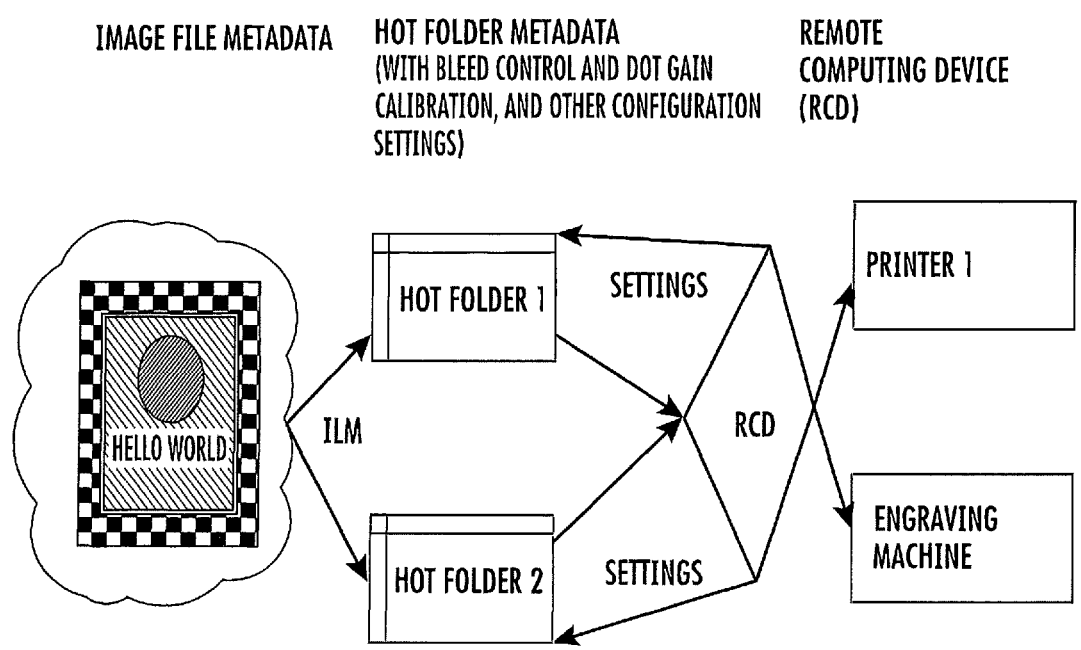
FIG. 7 is block diagram of metadata management and imaging control through Hot Folder storage.
Figure 9:
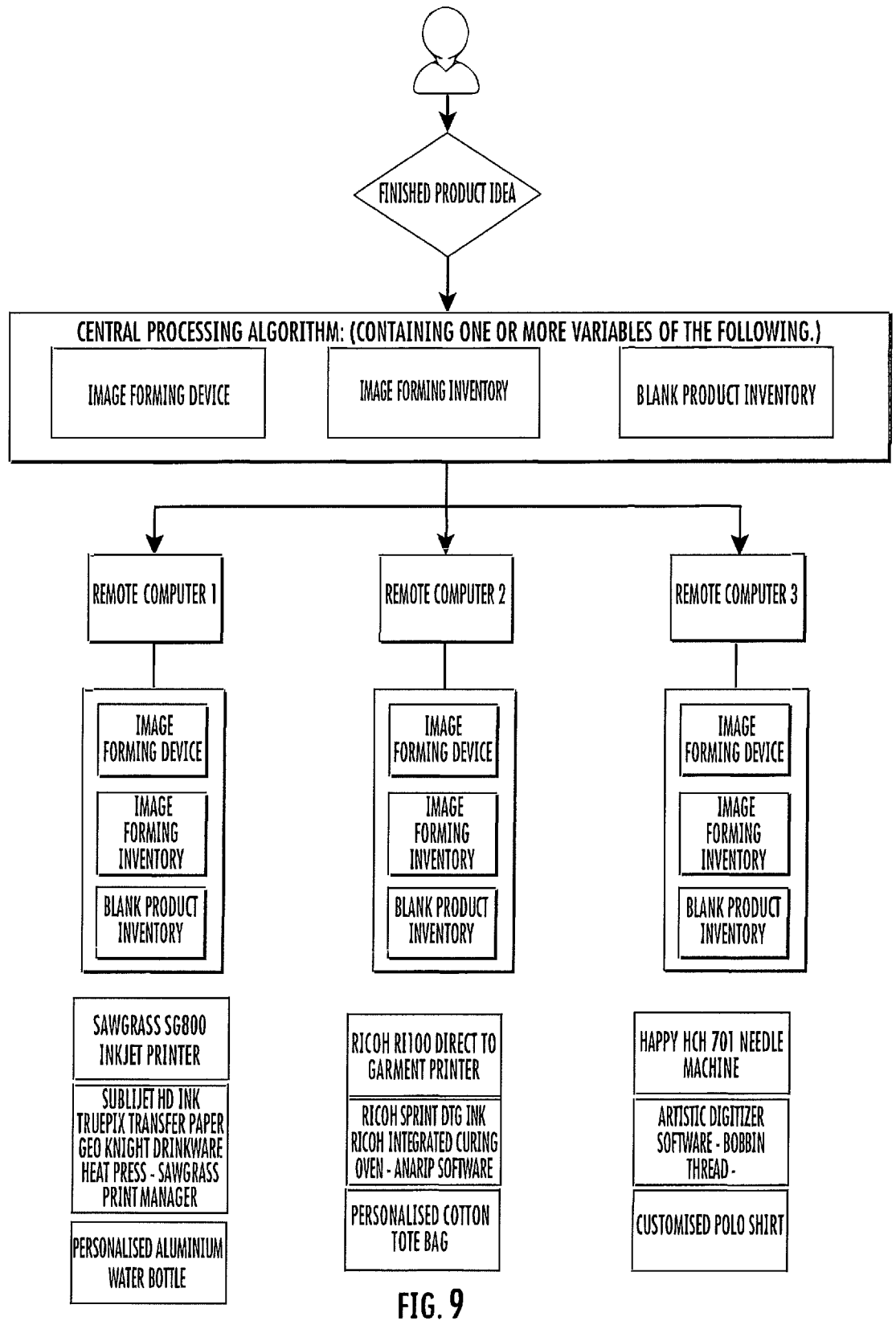
FIG. 9 is a flow chart demonstrating a network imaging production process.

The geographically RCD also communicates specifications of a blank product or blank products to be imaged to the CCD. Optional blank products may be first communicated to the geographically remote RCD, with the user of the geographically RCD selecting specifications of a substrate or substrates upon which the image is to be formed (FIG. 7a).

The CCD selects a geographically remote fulfillment product image forming device(s). It is preferred that remote fulfillment product image forming devices that are part of the network comprise different technologies and configurations to handle different required imaging specifications, and are available at many separate locations, such as in most cities in world. The invention as described, in an embodiment, can image an intermediate substrate such as paper, using relatively inexpensive desktop printers and heat activated inks, such as ink jet printer ink comprising sublimation dyes. An imaging operation that will fill orders for customizing many blank products costs a few hundred dollars, and therefore, such remote printers can be made available at minimal cost a location that is very near the consumer of the imaged blank product. Local fulfillment that is part of a geographically diverse distribution system is available according to the invention. In some cases, certain imaging requirements will require more sophisticated remote fulfillment product image forming devices. The CCD chooses the geographically remote fulfillment product image forming device as a function of factors such as the selected image and blank product, product image forming device capabilities, and the consumer's location. Image quality and consistency is maintained by the CCD selecting an appropriate geographically RCD/product image forming device(s) and providing the product image forming device(s) the appropriate instructions, rather than the instructions for imaging being determined locally at the product image forming device(s).

The CCD communicates a graphic image file for the image to be formed, along with the specification(s) of the blank product to a fulfillment product image forming device (RCD) that is associated with the geographically remote fulfillment product image forming device. The CCD may also select product image forming inventory from a plurality of product image forming inventory specifications. The product image forming inventory specification is communicated to the fulfillment product image forming device (RCD), FIG. 5b.

The CCD communicates imaging instructions to the RCD/fulfillment product image forming device. Determining the instructions for the image and blank product the RCD/product image forming device maintains quality and consistency from location to location. These instructions may include, color management profile(s), ink limiting parameters and print head waveform. These instructions are selected by the CCD as a function of factors such as the product image forming device capabilities, graphic image file requirements, the product image forming inventory specification and the specification of the blank product. Other information communicated from the CCD to the remote fulfillment product image forming device (RCD) may include image resolution, ink droplet sizes, and frequency, such as piezo pulse frequency, pulse pressure and voltage to the geographically remote fulfillment printer.

The CCD and/or the fulfillment computing device (RCD) causes the geographically remote fulfillment product image forming device to form the image selected using the product image forming inventory selected and according to the information provided by the CCD. The product image forming device forms an image according to the image selected to be formed on a blank product according to the specification of the substrate selected from the RCD.

In one embodiment, the ink specification selected by the CCD is a heat activated ink, such as an ink comprising sublimation dye. The geographically remote fulfillment product image forming device (printer) prints the image selected on an intermediate substrate, which may be paper. The image is transferred by application of heat and pressure to the substrate, which is rarely paper, and is commonly a ceramic, metal or textile substrate. The substrate may be three dimensional in some instances.

In other embodiments, the image may be formed by directly imaging on the selected blank product. An engraving machine may image the blank product. In another example an embroidery machine embroiders the blank product. If the product image forming device is a printer, ink or toner may be selected by the CCD from, for example, dye based inks, heat sensitive inks, radiation curable inks, and 3D heat fusible printing inks or toner. The inks or toners are selected as a function of factors such as the image to be printed, printer capabilities, waveform addressability, media or blank product handling ability, and the selected blank product.

The present product imaging or product customization system may use surface product image forming devices, such as an inkjet printer, or it may use imaging devices that provide product configuration, such as devices that form shapes or form objects that are two or three dimensional. Such devices are remotely accessed and linked digitally or by computing devices according to the invention. Software algorithms may be used enable or perfect desired final imaging results. Either additive manufacturing (such as ink/toner deposition printing, transfer paper/film imaging, 3D printing or digitally-controlled embroidery/needle machine use) or subtractive manufacturing techniques (such as computer-guided laser cutting/engraving), or combinations of the two techniques may be employed. A combination of imaging techniques for networked mass customization provides complex imaging with unique and/or best quality results.

The substrates or product blanks to be imaged, in one embodiment of the present invention, are blank product inventory that is imaged according to the invention. Information about available blank product inventory at the location of the remote computing device, such as brand, quantity, batch/lot number, suitability for a particular imaging process, fulfillment certification status, origin of the manufacturing process, and the like are tracked through the networked system, along with product imaging inventory such as ink/paste, toner, colorant, 3D manufacturing ink/powder/filament or thread, transfer paper/stock paper, stock image/design, so that product imaging or customization is accurately fulfilled at each segment of the process such as production, supply center, and transportation. Preferably, goods are labeled, packaged, transported, stored or used with digital logs (such as 1D Barcode or QR code) with just-in-time (JIT) status through the course of the entire imaging process and delivery process, and the information communicated to central computing device (CCD) for the purpose of data acquisition, monitoring, data analysis/machine learning, quality control, and/or operation optimizing. Typical imaging substrates or blank products include mugs, T-shirts/apparel, roll fabrics/textile materials, smart phone covers, gift cards, tote bags, water bottles, coasters footwear, ceramics/stoneware, metal sheets, floor mat/carpets and other consumer items.

An example of product imaging production devices and processing according to an embodiment of the invention is demonstrated by FIG. 10. A customer places an order for a decorated finished product. The customer specifies, at a minimum, the design or image to be produced the blank product upon which the design or image will be formed, and a location for delivery of the finished product.

Figure 11:
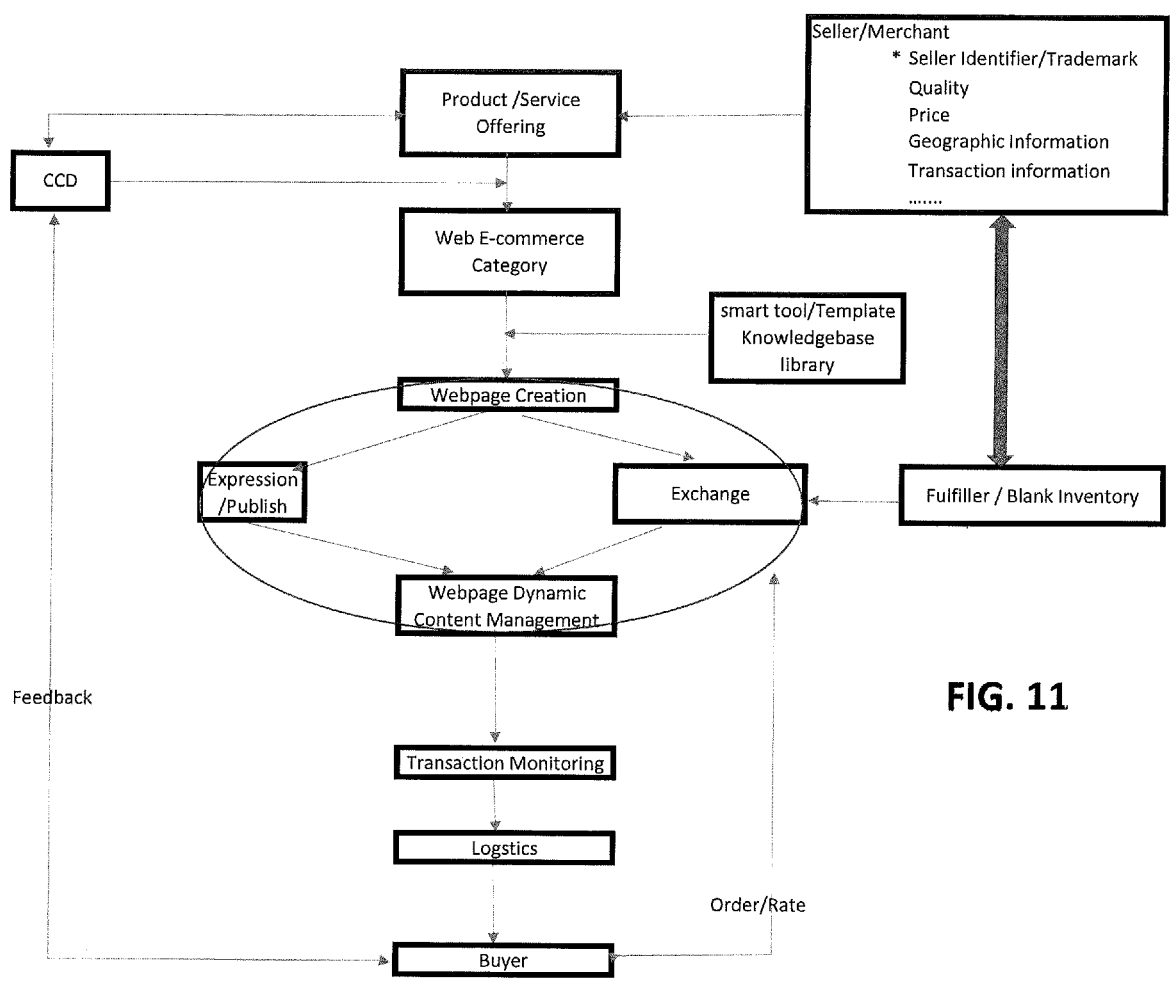
FIG. 11 is a flowchart of webpage automation process

The blank product may comprise ceramic, textile, metal, polymer, wood or glass. FIG. 11. Examples of specific blank products include coffee mugs, shirts, wood and metal plaques, mouse pads and trophies. The blank products may be substrates upon which an image is formed as enumerated or described herein.

The chosen design or image may be formed upon the blank product. An example is a printed image formed of ink, paint or toner. The design or image may be engraved, such as by engraving metal or glass. A design may be formed by cutting, such as cutting metal, wood, glass, plastic or other materials from which the blank product is formed into a desired shape.

After the blank product and design and/or image are chosen by the customer, the blank product and design and/or image are provided to the central computing device (CCD). The CCD employs an algorithm that determines the production specifications for the finished product, including the examples provided herein.

The CCD is connected to multiple remote computing devices (RCD) that are geographically separated. By "geographically separated" it is meant that the RCDs are located in multiple cities, and preferably multiple states, provinces and/or countries. Each RCD communicates to the CCD the capabilities of the RCD and the location of the RCD. Each RCD communicates the image forming device available at the geographic location, and the blank product inventory available at the geographic location, and for many image forming devices, the product image forming inventory available. For example, the RCD will communicate whether it has available a printer, a laser cutter, and/or an embroidery (needle) device as one or more image forming devices, and the specifications of the image forming device(s). For a printer, the RCD will communicate specifications that include the type of printer, the ink or toner used by the printer (such as inks described herein), and the carriage width of the printer, as well as the software used to control the image forming device. The RCD will communicate to the CCD the image forming inventory available at the geographically remote location. Image forming inventory may include the ink or toner inventory and the type of ink or toner (such as sublimation ink, laser toner, or pigment ink), or types, colors and inventory of embroidery materials, In another embodiment, the RCD will communicate 3D printing capabilities of a 3D printer, and available image forming inventory, such as ABS plastic, PLA, polyamide (nylon), wood, glass filled polyamide, stereolithography materials (epoxy resins), silver, titanium, steel, wax, photopolymers and polycarbonate.

The CCD then selects an RCD to form the finished product. Priority will usually be given to the RCD that is geographically closest to the final delivery location of the finished product. The RCD with the closest final delivery location must also have the capability to image the finished product, and if not, the closest RCD to the final delivery location having the capability to image the finished product will be chosen by the CCD. The RCD must have the required image forming device and product image forming inventory, and suitable blank product inventory.

The CCD provides to the selected RCD the image specification, the blank product specification, and operating specifications for the image forming device to achieve the finished product as ordered by the customer. The operating specifications may include specifications for image quality, dot gain, waveform and frequency, ink printing channel selection, total ink/consumable requirement, multiple imaging path/step and sequence instructions, substrate batch or quality requirement, feedback data manipulation and/or collection/storage instruction, quality control/assurance parameters and instructions, and in the case of printing, specifications as described herein. The specifications may include directions for cutting, etching, material pre-treatment and after-treatment, printing and embroidering and other applicable information relevant to finished product requirements. The invention provides quality control for uniform product quality for product imaging over a range of blank products or substrates and image forming devices. Product delivery information is also provided to the selected RCD by the CCD.

In one embodiment, the invention enables e-commerce participants to easily create an e-commerce website. Participants may connect to various participants in networked e-commerce activities including sellers or merchants, fulfillment locations, manufacturers, inventory sources, financial transaction providers, data processors, service providers, or/and logistics providers. A web/internet or cloud-based server or servers may provide e-commerce participants with interfaces through their local computing devices for customized web design, product design, and image design and product ordering processing linked through a central computing device (CCD). FIG. 11 demonstrates an exemplary network structure with various digital network ecosystem components, and workflow processes.

Figure 12:
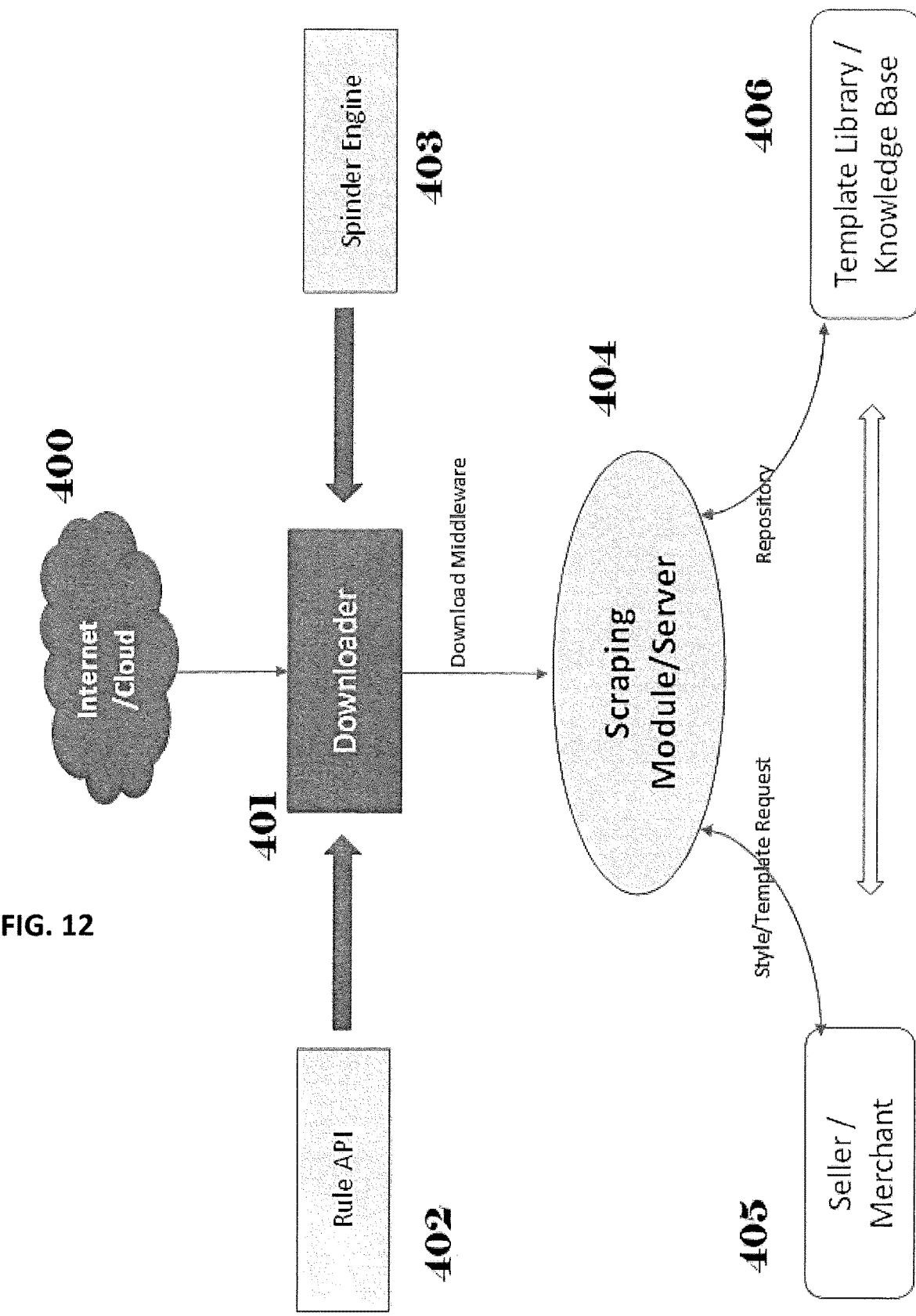
FIG. 12 illustrate the e-commerce webpage template collection via scraping engine through internet
Figure 13:
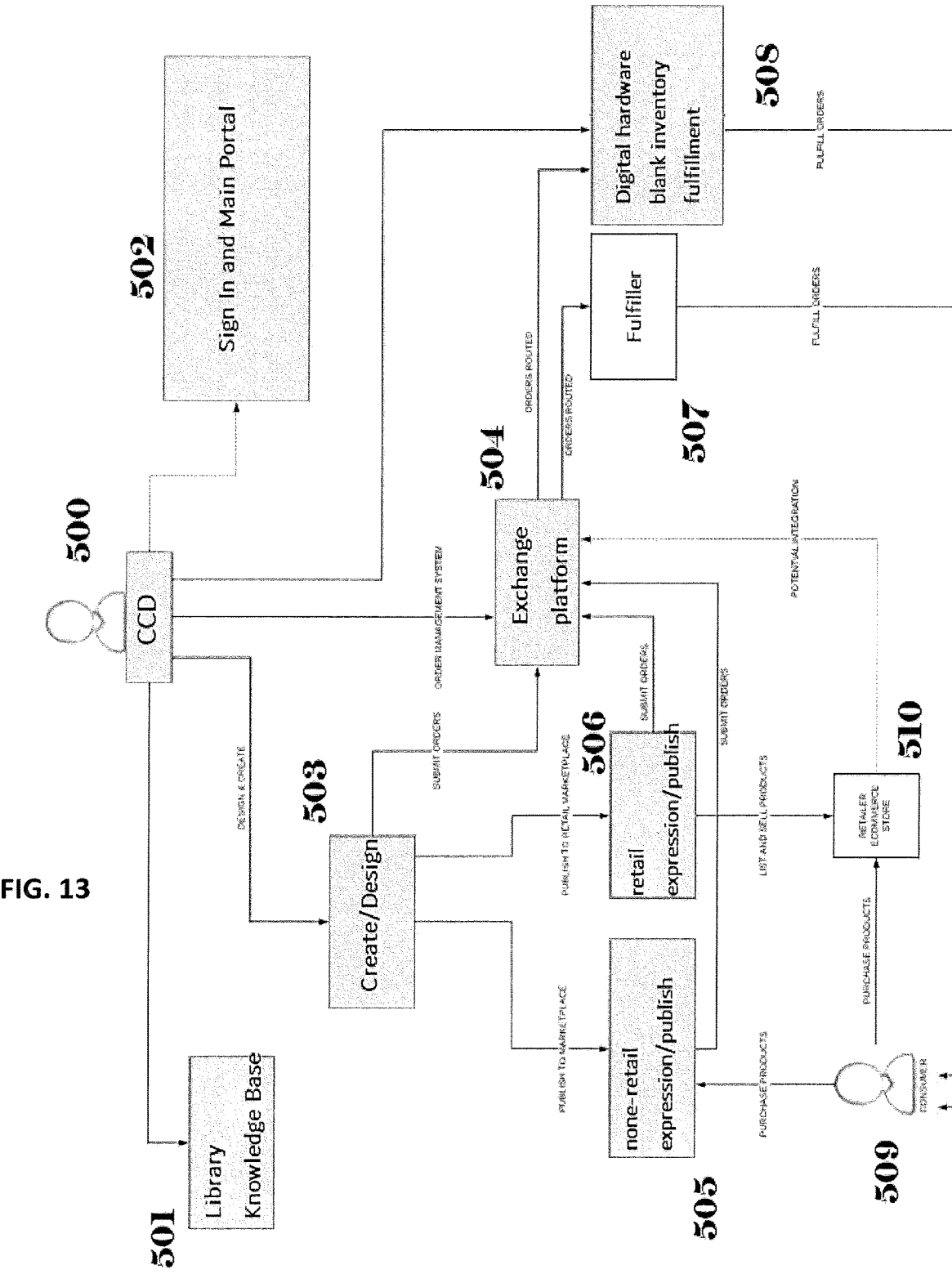
FIG. 13 shows different computing/server components of the network and activity flowchart under central computing device

In one embodiment, an e-commerce website for producing custom decorated products can be established by a seller or merchant (FIG. 13, 510) who has little to no skill in creating a website or in producing customized goods. A website template may be provided to the seller, such as by the proprietor of the CCD (FIG. 13, 500). The website template may be produced by web scraping (FIG. 12), using an Application Programming Interface (API) in one example, or by the digital template library (FIG. 13, 501) provided by the ecosystem. The seller is prompted to provide information. The information may be as minimal as an identifier of the seller, such as a trademark, seller name, logo, brand or other design. A website customized for the seller that uniquely identifies that seller and distinguishes the seller from other sellers on the network is created from the information by the central computing device. A seller who wishes to provide custom imaged products incorporating the seller's brand or logo can create the e-commerce site as described with a minimal investment of time or resources.

Product or service information by the networked e-commerce participants or sellers may further provide information in establishing the website that includes, but is not limited to, product category, product name, product identification number, product description and specification, quality assurance and/or certification status, price, discount or promotion schedule, payment methods accepted, contact information (address, phone number, email address, social network identification, etc.), and shipping and handling information (FIG. 11).

A production information API may reside on the both the network computer server and the computing device of network participant including sellers and buyers allows product and commerce information to be extracted from the participants and automatically followed by a corresponding website creation at the network computer server. Validation from the participant with a login API working in sync with the product information API or dynamic contents update through the publish and populating process of the developed website. (FIG. 13)

Both the automated e-commerce website and webpage may be provided with a unique Universal Resource Locator (URL) address. The website or webpage is accessible and populated to the internet community and participants of the network served by the CCD (500) through server gateways and API keys (502), based on a set of application programming interfaces. These participants may use their personal digital communication devices such as computers, mobile and smart units to input product or service information by uploading such information to computer servers, for example, the CCD (500). Corresponding webpages, available to the network, and perhaps general internet public, provide selected details for soliciting, selecting, and/or enforcing commercial transactions. Certain features or functions, through private API key activation, may be reserved for network participants or members for exclusive benefits such as discounts, promotions, product or inventory exchanges, and other commercial benefits.

Previously prepared and designed templates having graphical, textual, and/or dynamic contents may be available in one or more library or knowledge based servers. Depending on the category and nature of the product or service provided by the e-commerce network the API or computer program module may adapt automatically and publish on the ecommerce ecosystem via internet (World Wide web) subsets of buyers that can access, browse, search, order and otherwise utilize the network.

A web scraping or web harvesting engine may be used for sellers or merchants to select a preferred basic web design structure or style from multiple options. A server in the network (404) may search the internet (400) based on the product offering to be provided by the seller/merchant (405, 510) and download corresponding information meeting the criteria for the offering using middleware (401), governed by predesigned rules or regulations (402). The server converts the structure, style, and other relevant information obtained into a suitable template for the seller's website or webpage. A spider storage engine (403) with customized spider middleware may be used for storage before and after conversion processes, and with the information to the template library. (406, 501) Various development web-development languages or protocols such as Asp.net Core may be used to compose the interface or middleware.

A dedicated computer server or internet cloud service, though connected, monitored and controlled by the CCD (500), may be utilized for the purpose of website expression (FIG. 13, 505, 506) for multiple e-commerce participants, allowing information flow, and fulfilling commercial activities according the production system of the invention. Such server or service may be controlled by a private gateway so that privacy and security are provided for the participants.

The seller may also be provided with choices of optional blank products (FIG. 13, 508) which the seller may offer from the seller's website or webpage (504). These choices may be provided from the CCD, or by a proprietor or a network e-commerce participant or associate of the operator of the CCD, who may also provide the digital template and image library (501) for establishing the seller's e-commerce website (504). The seller chooses products from the blank product catalog that the seller wishes to sell. The available blank product options are provided to the website, such as from the CCD (500), and listed on the website as being available to the customer (509).

Each seller or network ecommerce participant may have multiple products or services each having multiple and different specifications, quality, designs or pricing. The website or webpage creation protocol may have additional tools or APIs (FIG. 13, 503) to meet the requirements of suppliers and sellers. These tools provide unique webpage design for each seller/merchant with varying page layouts, graphic appearance, distribution, content display and viewing, searching capabilities, dynamic price structuring, dialog capabilities with buyers, and even automatic fulfillment supplier selection/comparison based on the seller's commercial preferences and aesthetic objectives. The resulting webpage provides unique identity characteristics and underlying features that are different from other e-commerce participants, even within the same ecosystem. A unique website presentation maximizes the seller/merchant's attractiveness to buyers and improves the efficacy of the website.

Commercial or customized tools and interface programs may be used to perfect the functions or features needed for website commercial needs. These functions or features may include basic webpage establishment, linguistic translation, automatic spell checking, time zone conversion, currency exchange conversion, real-time or dynamic content editing, graphic design or photo insertion and alignment, web linkage verification, etc. (FIG. 11) At least one catalog API, for example a site search API, allows buyers to properly view, search, and select products or services based on a finalized webpage within the network. Data flow of various types is indexed, monitored, coordinated and controlled by CCD (500).

The networked computer server or cloud service portal (503) for the automatic website or webpage creation may further provide additional functions for the purpose of communications, facilitating currency or other monetary exchange, presenting, populating, promoting, transacting commercial activity realization and interfacing with the end customer or buyer through the internet or cloud. Separate servers may be used for different elements of these functions, or additional functions to achieve higher quality digital management control.

A fully developed template and/or knowledge based library in one embodiment may provide business cases and/or a question/answer database in relevant e-commerce areas. Web design templates, stock design images and/or graphic designs may also be provided. This feature may be provided by a standalone server (501) through a dedicated computing gateway switch, or as a portion of a server in conjunction with other functions using dedicated API key controls. This and other interface programs may be used by network participants focused on e-commerce product or service selling, and may also be provided for fulfillment providers interested in joining the e-commerce network, and whose activities are solely in manufacturing or the production of customized goods. The knowledgebase interface may also benefit buyers (509), not just in gaining product knowledge, but potentially by transitioning such parties into network sellers (510) or fulfillment manufacturer/producers (507).

In another embodiment, a graphic design API and/or product design tool or module (503) such as CreativeStudio® is included in the networked e-commerce ecosystem. Buyers may access an online API or module to assist in creating personalized and/or customized product designs with various graphic, material, blank product, or specialty requirement needs. For instance, a stock image may be used to select a preferred holiday smart phone cover with corresponding pictures and texts. In addition, e-commerce customers or buyers (509) may also upload images or designs of their own creation to meet special product imaging requirements. Demonstrations of how to use these graphic or product design tools or modules may be attached to the networked e-commerce participant's website, allowing easy access for interested buyers.

Commercial software development tools and cloud services may be used for cloud based application programming interface and integration, or data processing, storage, or management. Examples include, but are not limited to, I Cloud (owned and provided by IBM), Azure (owned and provided by Microsoft) or AWS (owned and provided by Amazon) cloud environments. These commerce platforms may be used in conjunction with local computer servers and data flow balancing so that both efficiency and redundancy can be ensured. A dynamic data backup or mirror server/data center may also be used to further enhance the integrity and/or safety of the e-commerce information.

Hypertext Markup Language (HTML) is the standard markup program language for the present invention in terms of webpage or website creation. However, the interface program or data handling of the network ecommerce may use various different programming languages or tools. Commercial interface products may be integrated into the system. Examples of these API or program modules may include Semantics3, BigCommerce's API such as Login API or Catalog API, Snipchart, ForxyCart, Due, Square, Stripe, Taxjar's SmartCalcs, Fomo, Indix, Remarkkety, Shippo, UPS API, Recombee, FraudLabs Pro, Open Exchange Rates API, and Shopify. One skilled in the art may adopt suitable interface and data process application tools to fit the purpose of the ecommerce activities. Networked e-commerce participants who wish to install API applications on their corresponding digital computing device need no skills or knowledge of these specific programming languages, but can follow concise instructions given by the interface tools. Generic Internet or website browsers may be necessary for buyers or customers to complete ordering, communication and transaction needs.

Different operating systems, such as Microsoft Windows, Linux, Android, Apple Mac OS, Apple IOS and the like may be used by network e-commerce participants and buyers to access commercial webpages created by the present invention. These operating system may include an Internet Information Services component that provides access and operating functionalities and features. These functionalities and features ensure that website pipeline and access operates smoothly across different servers and data management subsystems.

The present invention is able to cover the entire globe. Participants and buyers from different countries/regions, religions or cultures may interact through internet connections. A useful feature of calendaring for periodic promotions, discounts or event management purposes, with different pricing schemes may be applied. A standalone application programming interface may be added into the automatic web creation and/or through webpage dynamic content management (FIG. 11), allowing participants or sellers to add, modify, update or delete offerings based on specific commercial needs.

The seller may use image or graphics design tools, such as CreativeStudio® or CorelDRAW®, to provide design templates to the customer that are suitable for imaging each blank product in the available inventory, or the seller may provide use of design tools for the customer to create designs. Additionally, or alternatively, the customer or buyer may also provide a design for imaging the blank product. In one embodiment, the seller provides a design template created by the seller that may be further customized by the customer or buyer.

After the customer has selected a blank product and has created, supplied or selected a design image, the information is provided from the seller to the CCD (500), and the order is fulfilled and delivered as described herein. The seller can fulfill the order in some cases, but it is not necessary for the seller to have the ability or capacity to fulfill the order. In one embodiment, it is not necessary for the seller to have any image forming devices, image forming inventory, or blank product inventory. In another embodiment, the seller may have an ink jet printer, but not a laser engraver or 3-D printer, in which case the seller can provide order fulfillment through a participant in the network as described herein. (FIG. 13)

Digital devices, including digitally driven or controlled printers, engravers, laser cutters, embroidery machines, or automated screen printers and the like (508) are also connected to the CCD (500) as part of the e-commerce network. These digital devices, in order to communicate with or be controlled by the CCD, are interfaced with API and digital device specific interface protocols. These API may be built with digital device Software Development Kit (SDK) tool packages or tool sets including files such as .H (Header File), .DLL (Dynamic Link Library), and/or .LIB (static library) files, which in turn build direct interfacing controls with these devices through firmware embedded inside of the device.

The networked e-commerce system may comprise a separate e-commerce ecosystem such as a public, private, or temporary subsystem, controlled by rules governed at CCD. These subsystems may open to designated customers or buyers. For instance, a separate 'store' may be created or interfaced only for wholesalers (505), limited to participants with bulk quantity commerce interests, whereas another subsystem retailer 'store' (506) opens to the general public offering smaller product quantities, such as a single customized fashion item. A networked e-commerce participant may join one or multiple subsystems by selecting options during the product information upload stage, or during any period after its entrance.

In today's e-commerce world, many individuals with business ambitions are willing to learn relevant skills to enable their success. These skills may be high specialized, and therefore, the skills may not have been previously available or integrated. For example, persons interested in digital surface imaging and customized product forming do need to learn intricacies of modern digital imaging equipment usage and services, color management skills, quality control and assurance, and graphic/product design, which could otherwise require extensive training and skills. A computer server (501) with dedicated API may be structured, in part or in conjunction with a template library, to allow the interested participant to selectively study, learn, train and search solutions, through the internet/cloud from the participant's computer or other digital device.

Augmented or Virtual reality (ARNR) equipment and programs, as part of the Library/Knowledge base (501), may be used to provide educational or training processes, especially where sophisticated digital equipment applications, and/or remote certifications or qualifications are involved. An example of such training is the use of digital sublimation inkjet printers for custom product imaging. Standardized procedures using a certified printer and peripheral equipment such as a heat press/vacuum heat press and colorimeter, and qualified/certified substrate selection or screening and personal protection processes may be involved. A virtual reality program and commercial or specialty VR equipment such as Oculus Quest goggles and/or a headset may be used to help identify critical elements or processes and also allow mistake-correction training, so that a trainee grasps important concepts and procedures.

One or more warehouse or inventory control participants may be included in the e-commerce network. A dedicated computer server or a server (508) with other interface or data management/process functions for inventory control and/or logistic management API may be used as part of the e-commerce network. The inventory server may serve one or more fulfillment units of ecommerce network, or act as an affiliate with one or more sellers to provide finished ready-to-sell goods or inventories. A shared inventory server with application interface can allow shared or dispatched inventory needs among multiple e-commerce network participants with optimized cost saving or timesaving for end users or buyers. A machine learning algorithm may be integrated in the application program interface to adjust e-commerce network system needs so that overall e-commerce activities may be optimized for network participants, through feedback from customers or buyers, sellers and fulfillers. (FIG. 11)

A centralized computer server or CCD (500) in the present invention is used to interface with different computer servers and data management components, and allows coordinated dynamic data and operating command flow amongst various platforms, including website or webpage commerce publication, customer order management, pricing adjustment, logistic handling, promotion event scheduling, communication, exchange rate calculation, and customer feedback and rating. A central webpage or website may have multiple weblinks directing interested participants and customers to login in and manage their activities, including modifying or updating subsystems from a seller, or searching or ordering by a buyer. Fulfillment or inventory participants can be dispatched with order information and handling the manufacture and production of the designated product or substrate material. Buyers can then be informed of updates to invoicing and delivery.

Data collection and data analysis computing programs or modules, in yet another embodiment, may reside in one or more networked e-commerce servers or cloud service platforms, under the supervision of the CCD. Webpage or website access records, customer interest or interest population, visit frequency, signing log, price change, etc. and non-web contents such as inventory levels, fulfillment processing, operating parameters among participants or the like can be recorded and stored for data tracking, verification and analysis purposes. Performance matrices based on the data analysis may provide feedback to participants for adjustment, modification and/or inventory control.

Customers or buyers may simultaneously access multiple ecommerce participants or sellers via publishing (505, 506) or exchange platform (504). The networked e-commerce ecosystem provides prices, shipping distances/times, product quality ratings and/or certification status, and participants' performance rating comparison API, module or computing mechanisms assist buyers in selecting the optimal seller or merchant to satisfy transaction requirements.

An anti-fraud computing module or API is a preferred element of the networked e-commerce ecosystem. A module of this type allows a network master from the CCD (500) and e-commerce participants to identify and verify malicious access to the network from remote locations or devices, especially from presumed consumers or buyers (509). Such module or API screens provide elements of orders, transactions with Internet Protocol address identification, proxy masking, geographic location, unproven financial ability, fraudulent credit card information, spyware insertion/uploading, and the like, and flag fraudulent processes before actual transactions are approved.

The physical location of various computer servers and data servers with functions described above may vary, depending on the specific commerce situation. Cloud service platforms may also be incorporated. Remote access is not always limited to provision through the Internet, World Area Network (WAN) but may also be provided by a Local Area Network (LAN). In some necessary cases, direct linkage with USB, network cable such as CAT5, CAT5E, CAT6, CAT6a, or even wireless connection between or among different system components is utilized. Digital printers, for instance, may be used for product fulfillment (508) in the networked e-commerce ecosystem, and may be accessed, monitored, and controlled through several levels of communication from a remote main server to a local computer, or through local wireless network connections.

What is claimed:

1. A method for providing images on products using a system comprising:
   a plurality of geographically separated image forming devices, each geographically separated image forming device being capable of data communication with a central computing device so as to permit communication to the central computing device of a specification of the image forming device and an image forming inventory of materials with which the image may be formed and a blank product inventory associated with the image forming device and available to the image forming device;
   the method comprising the steps of:
   the central computing device creating a plurality of custom websites for a plurality of sellers, each website of the plurality of websites presenting a plurality of image choices and a plurality of blank product choices;
   selecting an image and a blank product upon which the image is to be formed through a website of a seller of the plurality of sellers;
   communicating the selected image and selected blank product to the central computing device;
   the central computing device determining specifications for forming the selected image on the selected blank product;
   the central computing device using the determined specifications to select an appropriate image forming device of the plurality of geographically separated image forming devices for forming the selected image on the selected blank product based upon the specification of the image forming device available, and the image forming inventory and the blank product inventory available at the geographic location of the image forming device;
   forming the selected image on the blank product at the remote location using the image forming device selected by the central computing device from the plurality of geographically separated image forming devices.

2. The product imaging method of claim 1, further comprising the step of each seller of the plurality of sellers providing a seller identifier to the central computing device prior to the central computing device creating the custom website for the seller.

3. The product imaging method of claim 1, wherein the central computing device creates the custom website from a library contained in a database of the central computing device.

4. The product imaging method of claim 1, wherein the central computing device creates the custom website by scraping other websites.

5. The product imaging method of claim 1, wherein the geographically remote image forming device comprises a printer and a computerized embroidery machine.

6. The product imaging method of claim 1, wherein the geographically remote image forming device comprises a printer and a computerized embroidery machine, and wherein the printer comprises an ink jet printer and a direct-to-garment printer.

7. The product imaging method of claim 1, wherein the geographically remote image forming device comprises a printer and a blank product cutter.

8. The product imaging method of claim 1, wherein the geographically remote image forming device comprises a printer and a blank product cutter and wherein the printer comprises an ink jet printer and a 3D printer.

9. The product imaging method of claim 1, wherein the geographically remote image forming device comprises a printer and a computerized engraving machine.

10. The product imaging method of claim 1, wherein the blank product inventory comprises ceramics and textiles.

11. The product imaging method of claim 1, wherein the blank product inventory comprises ceramics and garments.

12. The product imaging method of claim 1, wherein the blank product inventory comprises ceramics and metal.

13. The product imaging method of claim 1, wherein the blank product inventory comprises metal and textiles.

14. The product imaging method of claim 1, wherein the blank product inventory comprises metal and glass.

15. The product imaging method of claim 1, wherein the blank product inventory comprises metal and wood.

16. The product imaging method of claim 1, wherein the central computing device selects an image forming device based upon the geographic location of image forming inventory consisting of textile, ceramic and metal.

17. The product imaging method of claim 1, wherein the image forming inventory comprises sublimation ink.

18. The product imaging method of claim 1, wherein the image forming inventory comprises yarn and printer ink.

19. The product imaging method of claim 1, further comprising the step of the central computing device communicating a waveform specification to the image forming device.

20. The product imaging method of claim 1, further comprising the step of the central computing device communicating an image specification to the image forming device, and the image specification comprises visual graphics information, image size and image resolution.

* * * * *